United States Patent [19]
Malone et al.

[11] Patent Number: 5,794,001
[45] Date of Patent: Aug. 11, 1998

[54] OBJECT-ORIENTED COMPUTER USER INTERFACE

[75] Inventors: Thomas W. Malone, Cambridge, Mass.; Kum-Yew Lai, Bukit Merah View, Singapore; Keh-Chiang Yu, Boston; Richard W. Berenson, Newton, both of Mass.

[73] Assignee: Massachusetts Institute of Technology, Cambridge, Mass.

[21] Appl. No.: 473,494

[22] Filed: Jun. 7, 1995

Related U.S. Application Data

[62] Division of Ser. No. 336,712, Nov. 9, 1994, which is a continuation of Ser. No. 888,249, May 22, 1992, abandoned, which is a continuation of Ser. No. 375,416, Jun. 30, 1989, abandoned.

[51] Int. Cl.$^6$ ................................................ G06F 15/00
[52] U.S. Cl. ........................................................ 395/342
[58] Field of Search ................................ 395/155, 161, 395/333, 334, 335, 339, 340, 341, 342

[56] References Cited

U.S. PATENT DOCUMENTS 5,630,120  5/1997  Vachey .................... 395/602

OTHER PUBLICATIONS

A. diSessa, "A Principled Design for an Integrated Computational Environment," Human–Computer Interaction, 1985, vol. 1, pp. 1–47.

A. diSessa and H. Abelson, "Boxer: A Reconstructible Computational Medium," Comm. of the ACM, Sep. 1986, vol. 29, No. 9, pp. 859–868.

I. Goldstein and D. Bobrow, "A Layered Approach to Software Design," In Interactive Programming Environments, D. Barstow, H. Shrobe, and E. Sandewell, Eds. McGraw-Hill, New York, pp. 387–413, '88.

I. Greif, "Computer–Supported Cooperative Work: Breakthroughs for User Acceptance," (Panel description), Proceedings of the ACM Conf. on Human Factors in Computing Systems (CHI '88), Washington, D.C., May 16–18, 1988.

Frederick N. Tou et al., "RABBIT: An Intelligent Database Assistant," Proceedings of the National Conference of the American Association of Artificial Intelligence, Pittsburgh, Pennsylvania, Aug. 18–20, 1982, pp. 314–318.

C. Batini and M. Lenzerini, "A Comparative Analysis of Methodologies for Database Schema Integration," ACM Computing Surveys, vol. 18, No. 4, Dec. 1986, pp. 323–364.

D. Heimbigner and D. McLeod, "A Federated Architecture for Information Management," ACM Transaction on Office Information Systems, vol. 3, No. 3, Jul. 1985, pp. 253–278.

M. Stefik, D. Bobrow, S.Mittal and L. Conway, "Knowledge Programming in Loops: Report on an Experimental Course," The AI Magazine, Fall 1983, pp. 3–13.

D. Tsichritzis, "Form Management," Communications of the ACM, Jul. 1982, vol. 25, No. 7, pp. 453–478.

H. Putnam, "The Meaning of 'Meaning'," In Language, Mind, and Knowledge, ed. by K. Gunderson. Minneapolis: Univ. of Minnesota Press, 1975, pp. 131–193.

(List continued on next page.)

*Primary Examiner*—Phu K. Nguyen
*Attorney, Agent, or Firm*—Wolf, Greenfield & Sacks, P.C.

[57] ABSTRACT

A computer user interface includes a mechanism for graphically representing and displaying user-definable objects of multiple types. The object types that can be represented include data records, not limited to a particular kind of data, and agents. An agent processes information automatically on behalf of the user. Another mechanism allows a user to define objects, for example by using a template. These two mechanisms act together to allow each object to be displayed to the user and acted upon by the user in a uniform way regardless of type. For example, templates for defining objects allow a specification to be input by a user defining processing that can be performed by an agent.

29 Claims, 28 Drawing Sheets

OTHER PUBLICATIONS

D. Lowe, "Co-operative Structuring of Information: the Representation of Reasoning and Debate." In the. J. Man-Machine Studies (1985), vol. 23, No. 1, pp. 97–111.

F. Halasz, "Reflections on Notecards: Seven Issues for the Next Generation of Hypermedia Systems," Comm. of the ACM, Jul. 1988, vol. 31, No. 7, pp. 836–852.

M. Stefik, G. Foster, D. Bobrow, K. Kahn, S. Lanning and L. Suchman, "Beyond the Chalkboard: Computer Support for Collaboration and Problem Solving in Meetings," Comm. of the ACM, Jan. 1987, vol. 30, No. 1, pp. 32–47.

J. Guttag, "Abstract Data Types and the Development of Data Structures," Comm. of the ACM, Jun. 1977, vol. 20, No. 6, pp. 396–404.

G.W. Furnas, "Generalized Fisheye Views," Proceedings of the ACM CHI Conf. on Human Factors in Computing Systems, Boston, MA, Apr. 1986, pp. 16–22.

G.R. Barber, "Office Semantics," Ph.D. thesis, Massachusetts Institute of Technology, 1982.

F.A. Turbak, "Grasp: A Visible and Manipulable Model for Procedural Programs," Unpublished M.S. Thesis, Dept. of Electrical Eng. and Computer Science, Mass. Inst. of Technology, (1986).

J. Lee, "Knowledge Base Integration: What Can we Learn from Database Integration Research.?" MIT AI Memo 1011. 1988.

J. Lee and T. Malone, "Translating Type Hierarchies: Framework Analysis and A Proposal," Sloan Work Paper No. 1974–88, M.I.T., Jan. 1988.

Dittrich, D. & Dayal U. (Eds.) (1986). Proceedings of the International Workshop on Object-Oriented Database Systems, Asilomar, CA. (QA 76.9.D3.I586).

Garrett, L.N. Smith, K.E., & Meyrowitz, N. (1986). Intermedia: Issues, strategies, and tactics in the design of a hypermedia document system. Proceedings of the Conference on Computer-Supported Cooperative Work, Austin, TX, Dec. 3–5, 1986, pp. 163–174.

Halasz, F.G., Moran, T.P. and Trigg, R.H. (1987). NoteCards in a nutshell. Proceedings of the 1987 ACM Conference of Human Factors in Computer Systems, (CHI+GI '87), Toronto, Ontario, Apr. 5–9, pp. 45–52.

Harp, B. (1988, Aug. 23). Position paper: Facilitating intelligent handling by imposing some structure on notes. AAAI 1988 Workshop on AI and Hyertext, St. Paul, Minnesota.

Lee, J. (1989). DRL (Decision Representation Language) and its support environment. Massachusetts Insitute of Technology, Artificial Intelligence Laboratory, Working Paper #325.

Lee, J. and Malone, T.W. (1988a). How can groups communicate when they use different languages? Translating between partically shared type hierarchies. Proceedings of the ACM Conference on Office Information Systems, Palo Alto, CA, Mar. 23–25, 1988.

Shriver, B. and Wegner, P. (1987). Research Directions in object-oriented programming, Cambridge, MA: MIT Press.

Smolensky, P. et al. (1987). Computer-Aided Reasoned Discourse, or, How to Argue with a Computer. Department of Computer Science and Linguistics, University of Colorado Working Paper #CU-CS-358-87.

Malone, T.W., Grant, K.R., Lai, K.Y., Rao, R., and Rosenblitt, D. (in press). The Information Lens: An intelligent system for information sharing and coordination. In M.H. Olson (Ed.), Technological support for work group collaboration, Hillsdale, N.J.: Erlbaum (Dewey HD 66.T44 1989).

Sluizer, Suzanne and Cashman, P.M. (1984). XCP: An experimental tool for supporting office procedures. IEEE 1984 Proceedings of the First International Conference on Office Automation, Silver Spring, MD: IEEE Computer Society, pp. 73–80.

Winograd, T. and Flores, F. (1986). Understanding computers and cognition: A new foundation for design, Norwood, NJ: Ablex. (Barker QA76.W58).

Trigg, R., Suchman, L., and Halasz, F. Supporting Collaboration in NoteCards, Conference on Computer-Supported Cooperative Work, MCC Software Technology Program, Austin, TX (1986).

Goldstein, I.P. and Bobrow, D.G. Layered networks as a took for software development. Proc. 7th Int'l Conf. On Artificial Intelligence, 1981.

Nii, P. The blackboard model of problem solving. The AI Magazine. Spring, pp. 38–53, 1984.

Skarra, A.H. and Zdonick, S.B. The management of changing types in an object-oriented database. In Proc. OOPSLA, Sep. 1986, pp. 483–495.

| Close | Cancel | Send | Change Template | *Others* |

BUG FIX REQUEST:

Subject: Bug Fix Request
To: Jintae lee
From: Thomas Malone
cc:
Reply-to:
Action Deadline: This Week
Bug:
  BUG
  Name: Edit template properties break
  Severity: Moderate -- several functions affected
  Software System: Object Lens
  Repeatable?: Yes
  Repeatable How: Try to "Edit Fields to show" on any template
  Keywords:
  Comments: This bug still appears, even after your last patch. The break occurs in attempting to get the Don't 96 Show values under EditorMixin.*GetFields ToShow.

Keywords:
Text:

Alternatives For Repeatable?:
  Yes
  No
  Don't Know

FIG.2

| Close | Cancel | Add Rule | Delete Rules | *Others* |
|---|---|---|---|---|

AGENT: New Mail

Name: New mail
Apply to: FOLDER: New Mail
Automatic Triggers: New Links
Keywords:
Comments: This agent sorts new mail into folder.

| Rule Browser: | | | |
|---|---|---|---|
| Name | | If | Then |
| — | — | From: Malone ; | Move To: Outgoing copies; |
| — | — | Action Deadline: Today, Tomorrow | Move To: Urgent; |
| — | — | Bug: Software System: Lens; ; | Move To: Lens Bugs; |

| Close | Cancel | Add Link | Delete | *Others* |

RULE:

Name:
If:

MESSAGE

Subject:
Date:
To:
From:

PERSON:

Name:
Job title: Vice president
Office:
Telephone Number:
Supervisor
Projects:
Keywords:
Comments:

cc:
Keywords:
Text:

Then:

MOVE

FOLDER:
To: Urgent

FIG.6

| Close | Cancel | Show Next | Delete Selection | *Others* |
|---|---|---|---|---|
| FOLDER: People | | | | |
| Name | Job title | | Supervisor | |
| Roy Kessel | Vice-president | | Robert Penta | |
| Charles Gray | Director | | Roy Kessel | |
| Mary Williams | Manager | | Charles Gray | |
| Karen Fox | Manager | | Charles Gray | |
| Frank Menaul | Software Engineer | | Mary Williams | |
| Lisa Hurvitz | Software Engineer | | Mary Williams | |
| Maurice Gilman | Systems Programmer | | Karen Fox | |
| Eric Stavris | Manager | | Charles Gray | |
| Susan Menario | Adminstrative Asst. | | Eric Stavris | |

FIG.7A

| Close | Cancel | Show Next | Delete Selection | *Others* |
|---|---|---|---|---|
| FOLDER: People | | | | |
| Name | Office | | Telephone Number | |
| Roy Kessel | 012-350 | | 357-0991 | |
| Charles Gray | 012-250 | | 357-0798 | |
| Mary Williams | 014-990 | | 357-5915 | |
| Karen Fox | 014-A1A | | 357-4821 | |
| Frank Menaul | 014-990 | | 357-2219 | |
| Lisa Hurvitz | 014-990 | | 357-3315 | |
| Maurice Gilman | 019-490 | | 357-6174 | |
| Eric Stavris | 014-A1A | | 357-3480 | |
| Susan Menario | 019-490 | | 357-6174 | |

FIG.7B

| Please select object (or its link) | | | | |
|---|---|---|---|---|
| Close | Cancel | Show Next | Delete Selection | *Others* |
| FOLDER: To do | | | | |
| Subject | | From | | Action Deadline |
| ILP Visit | | Elesse Brown | | 15-Oct-88 |
| Comments on paper | | Wendy Mackay | | 15-Oct-88 |
| Call Davis | | Elesse Brown | | 15-Oct-88 |
| Thesis Question | | Jintae Lee | | 25-Oct-88 |
| CSCW paper | | David Rosenblitt | | 12-Nov-88 |

FIG. 8

| Close | Cancel | Add Link | Delete | *Others* |

RULE:

If:

ENGINEERING CHANGE NOTICE

Subject:
Date:
To:
From:
cc:
Ignore Alter:
Part allected:

PART:

Name:
Part Number:
Subsystem:
Engineer responsible:

PERSON:

Name:
Job title:
Office:
Telephone Number:
Supervisor: Kevin Crowston
Projects:
Keywords:
Comments:

Keywords:
Comments:

Type of change:
Reason for change:
Severity:
Keywords:
Description of change:

Then:

MOVE

FOLDER:
To: Our group's ECNs

| Please select object (or its link) | | | |
|---|---|---|---|
| Close | Display | Delete Selection | Add Link  *Others* |

FOLDER: Counter Arguments

| Subject | Date | Author |
|---|---|---|
| Provides dynamic cla | 3-May-89 23:24:02 | David Rosenfield |
| No inheritance | 1-May-89 23:24:02 | John McGinnes |

| Close | Cancel | Add Link | Apply Rule |
|---|---|---|---|

Selection Rule

Apply to: FOLDER: Programming Language Choice
Select if:

ARGUMENT Description
Subject:
Date:
Author:
Supports:
Objects To: POSITION: Let's use C
Keywords:
Comments:

FIG.15

| Close | Cancel | Add Link | Hardcopy | *Others* |

RULE:

If:

ARGUMENT Description

Subject:
Date:
Author:
Supports:

POSITION Description

Subject:
Date:
Author: Beth Ritchie
Subject:
Responds To:
Keywords:
Comments:

Objects To:
Keywords:
Comments:

Then:

COPY

To: FOLDER: New arguments

FIG.17

| Close | Cancel | Add Link | Hardcopy | *Others* |

RULE:

If:

ARGUMENT Description

Subject:
Date:
Author:
Supports:
Objects To:

POSITION Description

Subject:
Date:
Author:

PERSON Description

Name:
Job title:
Office:
Telephone Number:
Supervisor: Michael Meeker
Keywords:
Comments:

Subject:
Responds To:
Keywords:
Comments:

Keywords:
Comments:

Then:

COPY

To: FOLDER: New arguments

FIG.18

MARCH 1989

| SUNDAY | MONDAY | TUESDAY | WEDNESDAY | THURSDAY | FRIDAY | SATURDAY |
|---|---|---|---|---|---|---|
| | | | 1 | 2 | 14:00 Lens project<br>3 | 4 |
| 13:00 Orientation<br>15:00 ILP visitors<br>5 | 6 | 15:30 CD Forum<br>7 | 8 | 9 | 14:00 Lens project<br>10 | 11 |
| 09:00 Juntae<br>12 | 13 | 14 | 12:10 Dave & Jim<br>15 | 16 | 14:00 Lens project<br>17 | 18 |
| | 09:00 NYC trip<br>20 | 15:30 CD Forum<br>21 | 22 | 23 | 10:30 Meet with T<br>11:00 CD Forum<br>12:15 Lunch with<br>14:00 Lens project<br>24 | 25 |
| 26 | 27 | 17:00 Hypertext<br>28 | 29 | 30 | 14:00 Lens project<br>31 | |
| | | | | Actions | February | April |

FIG.19A

```
  Close      Display      Delete Selection    Add Link      *Others*
FOLDER: 3/24/1989
  Name                    Date                Start Time Meet with Tom           3/24                10:30 AM
  CS Forum                3/24                11:00 AM
  Lunch with Dave         3/24                12:15 PM
  Lens project meeting    3/24                2:00 PM
```

FIG.19B

```
  Close      Cancel       Add Link       Hardcopy      *Others*
ARGUMENT: CS Forum
  Name: CS Forum
  Date: 3/24
  Start Time: 11:00 AM
  End Time: 12:00 AM
  Speaker: Frank Halasz
  Speaker's Affilition: Xerox PARC
  Place: E52-460
  Title: "Hypertext, Shmyperfect: What does it all mean?"
  Comments:
```

FIG.19C

| Close | Cancel | Trigger | Add Link | *Others* |

AGENT: Overdue tasks

Name: Overdue tasks
Apply to: FOLDER / *All Tasks
Automatic Trigger: Daily at midnight
Rule Folder: FOLDERS / Rule:
Comments:

| Close | Display | Delete Selection | Add Link | *Others* |

FOLDER: Rules

| If | Then |
|---|---|
| Due Date: < Today ; | Copy To: Overdue tasks; |

FIG.20

FROM FIG.26B

OBJECT-ORIENTED COMPUTER USER INTERFACE

This application is a division of application Ser. No. 08/336,712, filed Nov. 9, 1994, pending, which is a file-wrapper continuation application of Ser. No. 07/888,249, filed May 22, 1992, abandoned, which is a file-wrapper continuation application of Ser. No. 07/375,416, filed Jun. 30, 1989, abandoned, entitled OBJECT-ORIENTED COMPUTER USER INTERFACE.

TECHNICAL FIELD

The present invention relates to computer systems generally, and specifically to the portions of computer systems designed to display and to make available to the user the information stored therein.

BACKGROUND ART

With the increasing power of microprocessors, and of computers generally of any given physical size, there has been a widely recognized need for systems that would permit users who lack sophisticated programming skills to utilize this newly available computational power for a wide range of tasks. Many different approaches have been taken in order to try to satisfy this need.

One line of approach has tried to tame the ordinary and often complicated user interface of a computer system's operating system by providing an "operating environment" within which the user relates to the operating system without directly using the operating system's commands. The Macintosh Finder is an example of this approach.

Another approach is described in a recent paper by T. W. Malone et al., entitled "Semistructured Messages Are Surprisingly Useful for Computer-Supported Coordination," 5 *ACM Transactions on Office Information Systems*, No. 2, April 1987, pp. 115–131. In that paper, there are introduced the concepts of "semi-structured messages" and of "rules" for processing of these messages that are used in a system called "Information Lens".

The approach of operating environments is limited in that they are dependant on specific applications programs to provide access to databases having wide ranges of applicability to users, and the specific applications are not necessarily integrated with the operating environment. Furthermore, although providing some valuable concepts, Information Lens is limited to facilitating electronic mail communications and is not applicable to general databases.

SUMMARY OF THE INVENTION

The present invention provides a graphical interface between a user and a database (which may be shared among multiple users who may access the database at the same or different times) in such a way that the user may functionally access and modify the contents thereof for a wide range of applications in a uniform, intuitive, and simple manner. The invention harnesses the power of concepts from "objected oriented programming" for the benefit of computer users who are not sophisticated programmers. In a preferred embodiment, the present invention provides a computer user interface that includes an arrangement for the graphic representation of data records and agents as instances of types of objects. Each object type is defined by a template and has its own semistructured format for presenting data pertaining to instances of the object type. In a further preferred embodiment, messages, rules, and folders are also predefined types of objects, and object types may be defined as part of an inheritance hierarchy.

BRIEF DESCRIPTION OF THE DRAWINGS

FIG. 2 illustrates, in a preferred embodiment the use of embedded templates to allow related objects to be viewed and edited simultaneously.

FIG. 4 illustrates, in a preferred embodiment, the presentation of an instance of an agent.

FIG. 5 illustrates, in a preferred embodiment, an instance of a rule.

FIG. 6 illustrates an instance of a rule using embedded descriptions to create complex queries.

FIGS. 7a and 7b and 7c illustrate examples of reports created by presenting a folder through tables and trees as provided by a preferred embodiment.

FIG. 8 illustrates how a folder presented as a table can be used to summarize selected fields from Action Request messages.

FIG. 9 illustrates how rules can include multiple levels of embedded descriptions that refer to linked objects throughout the knowledge base.

FIG. 10 illustrates how a rule can be used to formulate a complex query to retrieve all the objects from a database that satisfy certain criteria.

FIG. 15 illustrates an example of the folder.

FIG. 17 illustrates the rule used by the agent of FIG. 16.

FIG. 18 illustrates in the same context a multiply embedded rule that may be employed to use information throughout a user's knowledge base.

FIG. 19 including FIGS. 19A–19C illustrates a specialized display format called "Calendar" used in a preferred embodiment of the invention.

FIG. 20 illustrates how a rule-based agent may perform automatic actions such as maintaining a folder of overdue tasks.

FIG. 21 including

DETAILED DESCRIPTION OF SPECIFIC EMBODIMENTS

Figure 1:
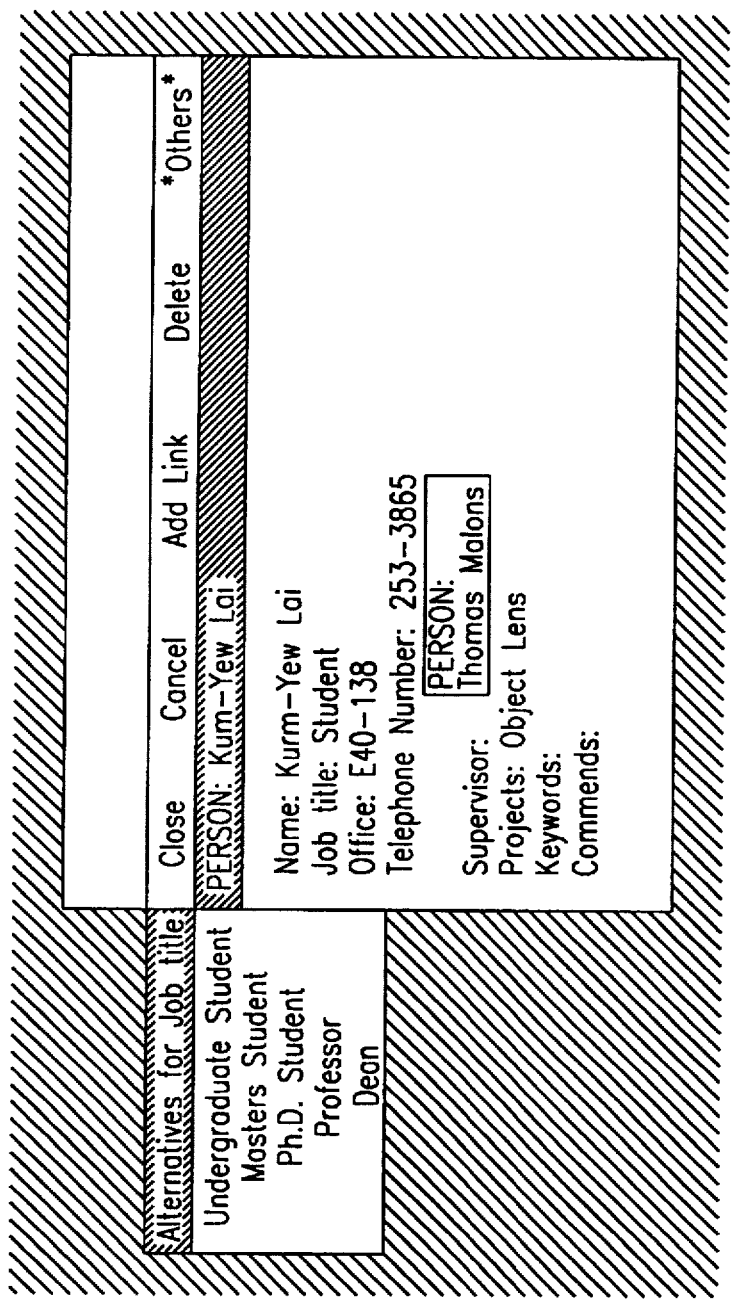
FIG. 1 illustrates, in a preferred embodiment of the invention, how objects can be edited with a simple template editor.

The present invention in a preferred embodiment has been implemented as a prototype in Interlisp-D on Xerox 1100 series workstations connected by an Ethernet. The prototype embodiment is called Object Lens, and it makes heavy use of the object-oriented programming environment provided by LOOPS, the built-in text editor, Tedit, which are available for use in conjunction with Interlisp-D. The source code listing for Object Lens is attached hereto and incorporated herein by reference.

The following description of Object Lens begins with a presentation of its key ideas. Thereafter are discussed features of the system with some simple examples, followed by a discussion of how these features can be combined to create a variety of cooperative work applications. Next is discussed the system architecture of Object Lens, and finally the specific program structure.

1. KEY IDEAS

One of the most important characteristics of Object Lens is that it is a semiformal system. We define a semiformal system as a computer system that has the following three properties: (1) it represents and automatically processes certain information in formally specified ways; (2) it represents and makes it easy for humans to process the same or other information in ways that are not formally specified; and (3) it allows the boundary between formal processing by computers and informal processing by people to be easily changed.

Semiformal systems are most useful when we understand enough to formalize in a computer system some, but not all, of the knowledge relevant to acting in a given situation. Such systems are often useful in supporting individual work, and we believe they are especially important in supporting cooperative work where there are usually some well-understood patterns in people's behavior, but where there is usually also a very large amount of other knowledge that is potentially relevant but difficult to specify.

In order to create such a flexible semiformal system, the knowledge embodied in the system must be exposed to users in a way that is both visible and changeable (cf., Turbak, 1986). That is, users must be able to easily see and change the information and the processing rules included in the system. In Object Lens, there are three key ideas about how to represent and expose knowledge to users:

(1) "Passive" information is represented in semistructured objects with template-based interfaces;

(2) "Aggregate" information from collections of objects is summarized in customizable folders; and (3) "Active" rules for processing information are represented in semiautonomous agents.

Discussed below is how semistructured objects and semi-autonomous agents allow us to expose knowledge to users in a way that is both visible and changeable.

Semistructured Objects

Users of the Object Lens system can create, modify, retrieve, and display objects that represent many physically or conceptually familiar things such as messages, people, meetings, tasks, manufactured parts, and software bugs. The system provides an interface to an object-oriented database in the sense that (1) each object includes a collection of fields and field values, (2) each object type has a set of actions that can be performed upon it, and (3) the objects are arranged in a hierarchy of increasingly specialized types with each object type "inheriting" fields, actions, and other properties from its "parents" (see Dittrich & Dayal, 1986; Shriver & Wegner, 1987; Stefik & Bobrow, 1986). For example, a TASK object may have fields like Requestor, Performer, Description, and Deadline; a PERSON object may have fields like Name, Phone, Address, and Job title; and a STUDENT object may add fields like Year and Advisor to the fields present in all PERSON objects. Some objects (e.g., MESSAGES) have specialized actions defined for them (e.g., Answer and Forward). As described in more detail below, we have provided rudimentary facilities for saving and sharing objects, and we are currently exploring ways to link our interface to remote databases.

The objects in Object Lens, like messages in the Information Lens, are semistructured in the sense that users can fill in as much or as little information in different fields as they desire and the information in a field is not necessarily of any specific type (e.g., it may be free text, such as "I don't know").

Template-based user interfaces.

Users can see and change objects through a particularly natural form of template-based user interface. These interfaces have a number of virtues. For instance: (1) they resemble forms, with which users are already familiar, (2) they conveniently inform users about the fields contained in an object and about other information such as the likely alternatives for different fields, and (3) their use is consistent across many different kinds of objects. We will see below how this interface approach, which was used for messages and rules in the Information Lens, can be easily generalized to many different kinds of objects.

Relationships among objects.

Users can easily see and change the relationships among objects by inserting and deleting links between the objects. For instance, the Requestor and Performer fields of a Task object might contain links to the Person objects that represent, respectively, the person who will perform the task. Then, for instance, when the user looks at the Task object, it will be easy to get more information (e.g., the phone numbers) about the people involved with the task. We will see below how this capability of linking objects to each other provides a rudimentary hypertext system as a special case (see Conklin, 1987, for an extensive review of hypertext systems). We will see below how it is also possible for an object to which a link appears to be displayed as an embedded template inside the original template.

Tailorable display formats.

Users have several options for changing the ways they see objects. For instance, they can easily: (1) select which fields will be shown and which will be suppressed, (2) rename selected fields, and (3) specify the default and alternative values the system presents for individual fields.

Inheritance hierarchy for objects.

The creation and modification of type definitions is simplified by arranging object types in an inheritance hierarchy (e.g., Stefik & Bobrow, 1986). New types of objects are defined as specializations of existing object types, and they automatically "inherit" all properties of the existing objects except those which are specifically "overridden." Since most of the information about new object types can thus be "inherited" from existing types, rather than having to be re-entered each time, creating new object types becomes simpler. Also, when an object type definition is changed later, the changes are automatically "inherited" by the specializations of that object type.

Customizable Folders

Users of Object Lens can group collections of objects together into special kinds of objects called Folders. For instance, folders can be created for groups of people (e.g., project teams, company directory), tasks (e.g., those completed, those to be done by you, those to be done by others), messages (grouped according to topic or urgency), and so forth. Users can also easily customize their own displays to summarize the contents of objects in a folder. For instance, they can select certain fields to be displayed in a table with each row representing an object in the folder and each column representing a field. They can also select fields from which the links between objects will be used to create a tree (or graph) display with each object represented as a node in the tree and each link in the selected field represented as a line between nodes.

Semiautonomous Agents

Users of the Object Lens system can create rule-based "agents" that provide specifications for processing information automatically on behalf of their users. (It is, however, within the scope of the invention to utilize processing specifications that are other than rule-based.) These agents provide a natural way of partitioning the tasks performed automatically by the system. As we will see below, agents can be "triggered" by events such as the arrival of new mail, the appearance of a new object in a specified folder, the arrival of a pre-specified time, or an explicit selection by the user. When an agent is triggered it applies a set of rules to a specified collection of objects. If an object satisfies the criteria specified in a rule, the rule performs some specified action. These actions can be general actions such as retrieving, classifying, mailing, and deleting objects or object-specific actions such as loading files or adding events to a calendar.

The agents in Object Lens are "autonomous" in the sense that once they have been created, they can take actions without the explicit attention of a human user. They are only "semiautonomous," however, in the sense that (a) they are always controlled by a human user (that is, all their rules can be easily seen and changed by their human user), and (b) they may often "refer" objects to their human user for action (e.g., by leaving the object in the user's in box) rather than taking any actions on their own.

Descriptions.

Since agents and rules are themselves objects, users can see and modify them with the same template-based user interface that is used for all other kinds of objects. To specify the criteria for when a rule should act upon a given object, users create descriptions of the objects to which the rules apply. A description is simply a partially filled-in template for an object of a particular type. Descriptions can also include embedded descriptions that specify characteristics that must be satisfied by objects to which the original object is linked. For instance, a description of a Task might include an embedded description of the Person who will perform the task. These embedded descriptions (like those in the Rabbit system [Tou et al., 1982]), allow users to easily specify object retrieval operations that are equivalent to "joins" followed by "selects" in a relational database.

2. SYSTEM FEATURES

Terminology: Objects and templates.

In this section, we will describe in more detail the basic system features of Object Lens and illustrate them with simple examples. Before proceeding it is helpful to clarify some terminology concerning objects and templates. First, we distinguish between object types (or "classes") and specific object instances (e.g., see Fikes & Kehler, 1985). We use the term object type to refer to a kind of object (such as Person or Task) and the term object instance (or simply "instance") to refer to a specific example of one of these object types (e.g., "Joe Smith" or "Task No. 17"). In contexts where the distinction between object types and object instances is not critical, we use the term objects to include both.

We also use the term template in two ways. First, in a general sense, in this description and in the following claims, we use the term template to mean a graphical display of field names and contents in consistent relative locations. Most of a user's interactions with Object Lens are based on such templates. Second, in the Object Lens screen displays, we use the word Template to mean object type definition. (When we use Template in this specialized sense, we will always capitalize it. In some places we also use the word "Type" interchangeably with "Template".) For instance, users can change the display format for all Person objects by editing the Template that defines the Person object type.

Editing Instances

FIG. 1 shows a template for an instance of a person. Using the built-in text editor, users can insert text or bitmaps in any field. In addition, when users click on a field name with the mouse, a list of likely alternative values for that field appears in a pop-up menu. The alternatives may be links to other objects or just text strings. Selecting one of these alternatives causes the alternative to be automatically inserted in the field. For instance, the figure contains a link to the Person object representing Kum-Yew Lai's supervisor. To insert links to objects that are not in the alternative list, the user (a) positions the cursor at the place in the template where the link is to be inserted, (b) selects the Add Link option from the menu at the top of the window, and (c) points to the object to which the link should be made. After a link is inserted, clicking on it with the mouse causes the object it points to to appear on the screen.

In the current version of Object Lens, users can insert any combination of text, numbers, links, and bitmaps in any field. Then, in some cases, type checking is done when the editing window for the instance is closed or when certain kinds of processing are done. For instance, the To and CC fields are checked for valid folders (see below for descriptions of rules and folders). In future versions of Object Lens, we will experiment with more restrictive type enforcement in certain fields. For instance, it should probably be impossible to even insert something other than a folder in the "move to" field of a rule action.

FIG. 2 shows a slightly more complex template; this one is for a Bug Fix Request message. One of the fields of this template is the Bug to be fixed and the value of this field is a link to a Bug object. In this case, instead of simply showing a link to the Bug object, the template contains an embedded template for the Bug object itself. The fields in this embedded template can be edited just like the rest of the fields in the template. We will see below how users can specify whether links to other objects should be displayed as link icons (as in FIG. 1) or as embedded templates (as in FIG. 2).

Creating New Instances

Figure 3:
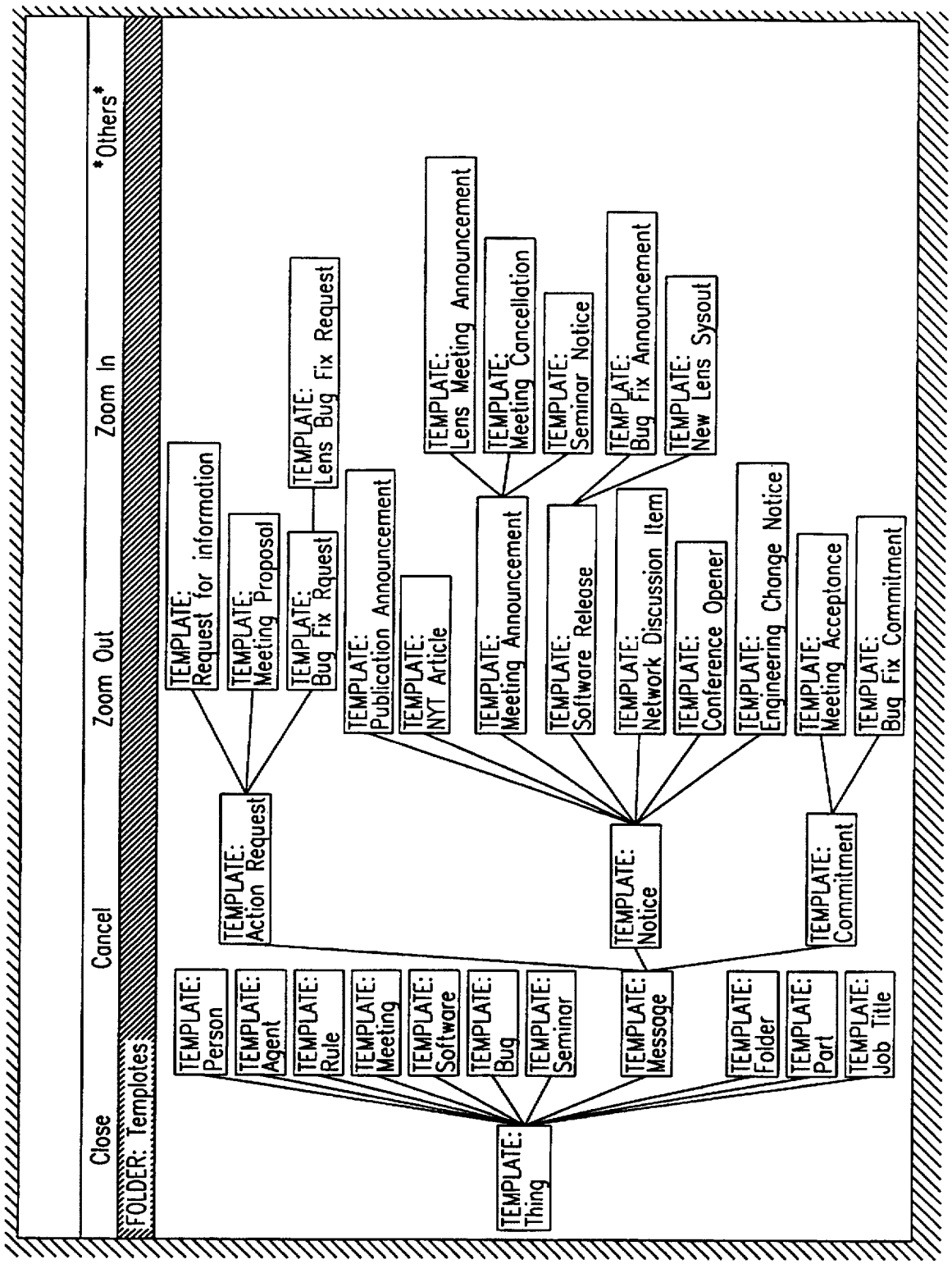
FIG. 3 illustrates, in a preferred embodiment, an example of how object types may be defined hierarchically.

To create and display a new instance of an object type that already exists, users click with the mouse on the definition (i.e., the Template) for that object type. FIG. 3 shows the Templates currently included in our system. For instance, to send a new message, users click on the Template for the type of message they want to create; to create a new person object, users click on the Person Template. Then an object instance, like those shown in FIGS. 1 and 2, will appear and the user can fill it in.

Creating New Object Types

To create a new object type, users click (with both mouse buttons, instead of the left one) on the Icon for the "parent" object type (see FIG. 3). This causes a menu to appear showing alternative actions that can be performed on a Type. One of these actions is to Create a subtype. When the user selects this action, a new type is created with all the fields and properties of its "parent." Then users can add fields to the new Type or change its display format and other properties (see below).

In the current version of Object Lens, all Things have three fields: Name, Keywords, and Comments. All objects inherit these fields, though as discussed below, some objects rename these fields or suppress their display. For instance, Messages rename the Name Field to be Subject and the Comments field to be Text.

Changing the Display Format and Other Properties of Object Types

To change the display format or other properties of an object type, users "edit" the Template that defines the object type. Users make these changes by selecting actions from the menu that appears when they click on the Type Icon (as shown in FIG. 3) with both mouse buttons. In this way, users can change (a) which fields of the Type's instances are actually displayed, (b) the names that are displayed for those fields, (c) the alternative values that are displayed for each field, (d) the default values that are displayed in each field when new instances are created, and (e) whether the links in a field should be shown as link icons (see FIG. 1) or as embedded templates (see FIG. 2). Users can also add or delete fields from a Type. All the changes made to a Type are applied to old instances of an object type as well as to newly created ones. For example, if the user changes the name of a field, then the new name will be shown when any old instances are redisplayed.

We anticipate that this system will be used with a core set of object types shared by the users in a group and that the fields in these types will be modified only by an "authorized view administrator." Other users will be able to change the display format of these types (e.g., suppress the display of a field or change its name), but they would not be able to delete or add fields to these "official" types. All users would, however, be able to create their own types as specializations of the official types, and for these types they could add and delete new fields as desired. Elsewhere (Lee & Malone, 1988) we have proposed a scheme for letting an arbitrarily large number of groups share partially overlapping sets of type definitions in arbitrary ways. One of the key ideas of this scheme is that specialized types created by one group can be interpreted by members of another group as instances of the most specific "ancestor" type that both groups share. For instance, a "Student" object created by one group might be interpreted as a "Person" object by another group that does not have a definition for "Student."

Folders

As noted above, Object Lens users can group collections of objects together into special kinds of objects called Folders (see FIG. 7). An object can be added to a folder in two ways: (1) automatically, as the result of a rule action, or (2) manually, using the Add Link action from the *Others* submenu on the folder. In both cases, the folders will contain links to the objects, not the objects themselves. Therefore, the same object can appear in more than one folder. Other actions for moving, copying, and deleting both objects and links are described below.

Object Lens currently provides two formats for displaying the contents of folders: tables and trees. Tables show the values of selected fields from the objects contained in the folder. For instance, FIG. 7a shows a folder that contains objects representing people with the fields displayed for a simple office directory. Users can easily tailor the format of these displays by selecting from a menu the fields they want to have included in the table. For instance, FIG. 7b shows the same folder, but with the display format changed to include a different set of fields.

Figure 7C:
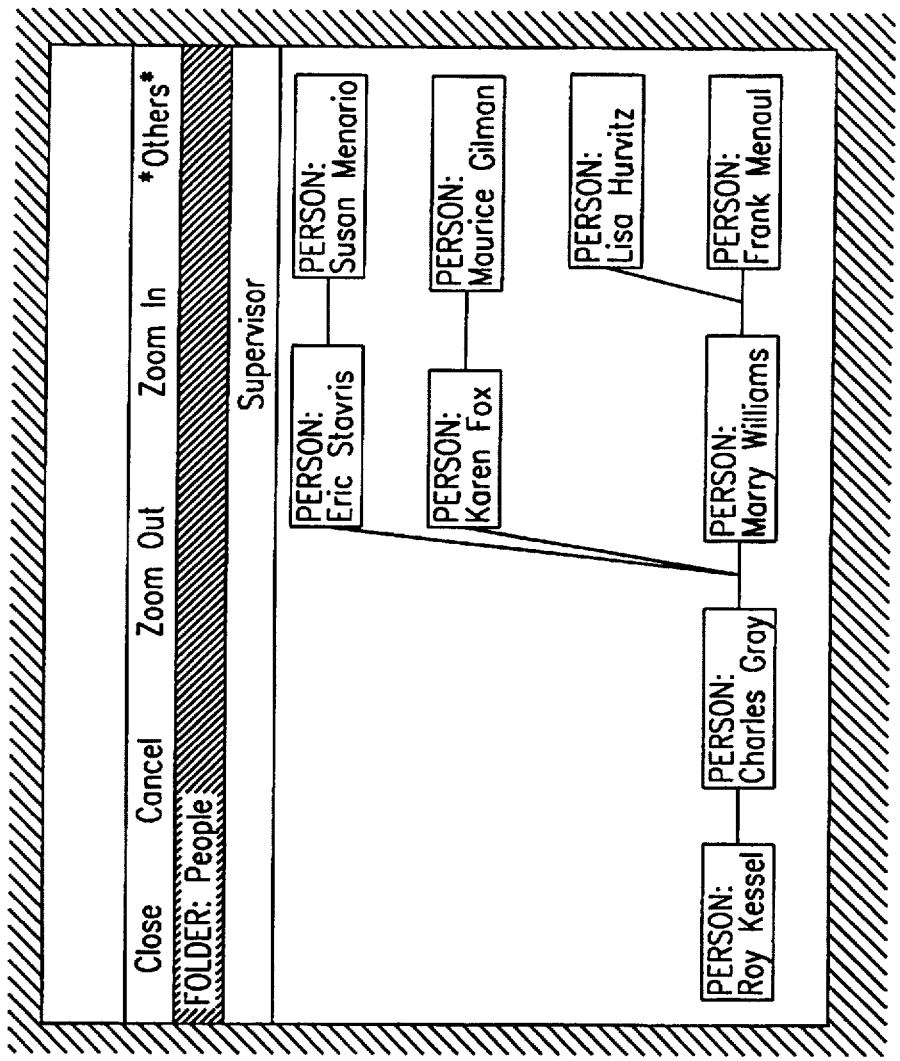

Trees are graphs that show the objects in a folder and the links that connect these objects. Just as users can select the fields to be shown in a table, they can also select the fields from which links will be shown. For instance, FIG. 7c shows the same folder again, but this time in tree format with the "Supervisor" field selected as the one from which links are displayed. In this case, the display resembles a simple organization chart. In the current version of Object Lens, links from multiple fields can be shown with the links from different fields being displayed as different types of lines (e.g., solid, dotted, etc.). This format may be described generally as a node-arc graph.

When a new folder is created, the user is asked to select the default object type to be contained in the folder. The user is then allowed to choose from the fields of this default object type when selecting the fields to show in a table or when selecting the fields from which links will be shown in a tree. Even though all folders have default object types, no strict type checking is enforced. If an object of an unexpected type is inserted into a folder, only the fields it shares with the default type are displayed in tables and trees.

Performing Actions on Objects

In addition to editing the contents of objects, users can also perform pre-defined actions on them. The actions that can be performed at any time depend on two primary factors: (1) the type of object being acted upon, and (2) the context in which the action is invoked.

Object specific actions.

Each object type has a set of actions that can be performed on it. Some of these actions are "inherited" directly from the "parents" of the object type. Others may be modified or added specifically for this object type. For instance, there are some actions, such as Hardcopy and Save that can be performed on all objects (i.e., all instances of Thing and all its subtypes). (Some of these actions, such as Hardcopy, are not yet implemented for all object types.) In addition, more specialized types of objects have other actions defined for them. For instance, agents have a Trigger action that triggers them to start running, and folders have a Change Display Format action that changes them from table format to tree format or vice versa.

In a few cases, the object specific actions depend not just on the type of object, but also on its state. For instance, messages created on the local workstation have a Send action, and messages received from elsewhere have actions such as Answer and Forward. So far these state-specific actions on objects are implemented as special cases. However, we are experimenting with a more general mechanism for representing state-specific actions and making this representation accessible to users. This mechanism defines each action as an object which contains a procedural description written in an Object Action Language. These user-defined actions are treated as object specific actions, and are constructed from the primitive actions available in the language. For instance, a user might create a modified "Hardcopy" action that does a hardcopy only if the "Printable" field of the objects is "True".

Context specific actions.

There are some actions that can be applied to any kind of object, but which can be invoked only from certain contexts. The primary contexts are: (1) from a template (like the one in FIG. 1), (2) from a folder that contains the object, (3) from a rule operating on the object, and (4) from a link icon for the object.

For instance, when an object is being displayed in a template, there are several kinds of actions, such as Close, Move, and Shape, that apply to the editing window. Other actions in a template include: (a) Add Link, (insert at the current cursor position a link to another object selected by the user), and (b) Cancel (close the window without saving any of the changes made since the window was last opened.)

When an object is displayed in a folder, other context-specific actions can be applied to it, such as: (a) Show (open an editor on the object), and (b) Select (select the item for some later folder action such as Delete Selection).

The actions that can be applied to an object by rules are discussed below. The actions that can be applied to link icons include: Show (open an editor on the object), and Delete (delete this link to the object).

Displaying and invoking actions.

Users invoke the above actions in slightly different ways depending on the context in which the object is displayed. If the object is displayed in a template (like the one in FIG. 1), then several of its most common actions are shown across the top of the template, and all other actions are shown in a menu that pops up when the *Others* action is selected.

When a link to an object is displayed (either as a link icon or as a row in a table), users can invoke actions in two ways. First, if users click on the link with the middle mouse button, a menu pops up showing all possible actions on the object. In addition, simply clicking on the link with the left mouse button invokes the most common action. For instance, clicking with the left button on a row in a table Selects the object for subsequent folder actions, while clicking with the left button on a link icon inside an editor Shows the object in another window on the screen.

Creating Agents and Rules

In some cases, agents can take actions automatically on behalf of their users. For instance, FIG. 4 shows an example of a simple agent designed to help a user process incoming mail. When an agent is triggered, it applies a set of rules to a collection of objects in a folder. The agent in FIG. 4 is applied to objects in the New Mail folder and is triggered by the arrival of new mail. That is, when mail is retrieved to the workstation, the mail program automatically inserts links to the new messages into the user's New Mail folder and these New Links trigger the agent. In the current version of Object Lens, two other kinds of automatic triggers are available: Daily at Midnight, and On the Hour.

Figure 5:
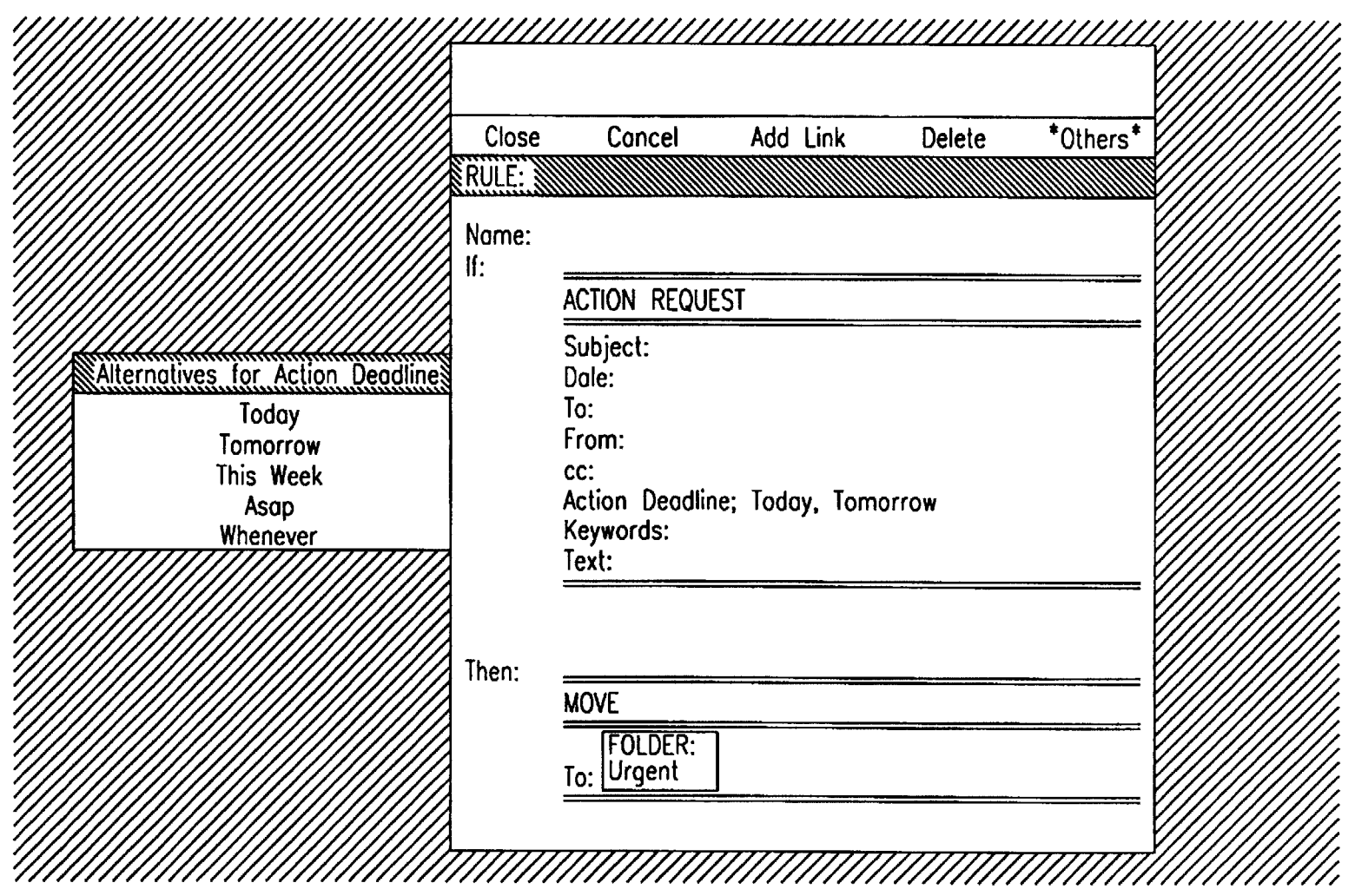

The agent shown in FIG. 4 includes several rules, one of which is shown in FIG. 5. A rule contains an "IF" field (predicate) and a "THEN" field (action). Both these parts of the rule contain links to other objects which are shown as embedded templates. The IF part of the rule is a description, a special kind of template that describes a set of instances in terms of the values of their fields. The THEN part of the rule is an Action object.

To construct the IF part of a rule, a user (a) clicks on the IF field with the middle mouse button, (b) selects "Descriptions" from the menu presented, and then (c) selects an object type from the tree of object types presented. This causes a description of the appropriate type to be inserted in the rule as an embedded template, and the user can then fill in the fields in this description to specify the values that must appear in particular fields for an object to satisfy the rule. As in the Information Lens, more complex specifications for a field can be constructed by combining strings with and, or, not, and parentheses (i.e., arbitrary Boolean combinations are possible within a field). If specifications appear in more than one field, then all specifications must be satisfied at once for the rule to succeed (i.e., specifications in different fields are implicitly and-ed). As in the other template-based editors in Object Lens, pop-up menus listing likely alternatives for a field are available in editing descriptions.

To specify the THEN part of a rule, a user simply clicks on the THEN field and selects an action from the menu of alternatives presented. These actions are applied to the "current object" (the object matched by the IF part of the rule) in the context of the "current folder" (the folder specified in the "Apply to" field of the agent). In some cases (such as the "Move" action shown here), the user also needs to fill in some fields in the embedded template for the action (e.g., the field specifying where the object is to be moved). The actions currently implemented in rules include the following: "copy" (add the current object to a different folder without removing it from the current folder), "move" (add the current object to a different folder and delete is from the current folder), "delete" (remove the object from the current folder), and "add keyword" (add the specified keyword to the Keywords field of the object). In addition, rules can invoke object-specific actions, including the actions that apply to all objects such as "hardcopy" and "save." Our ongoing work with action objects includes unifying those used in rules with those invoked by the user directly.

The rules are applied in the order in which they appear in the agent's rule folder. Users can create extended reasoning chains by having some rules set characteristics of objects (using the Add Keyword action) which other rules test (by checking the Keyword field).

Embedded descriptions.

With the capabilities we have described so far, all rules must depend only on information contained in the objects to which they are being applied. For instance, a rule about a message can depend only on information contained in the message itself. It is often desirable, however, to be able to specify rules that also depend on other information contained elsewhere in the knowledge base. For instance, in the Information Lens system, if a user wanted to specify a rule that applied to all messages from vice presidents, the rule would have to include in the From field, the names of all the vice presidents.

In Object Lens, it is possible to draw upon other information by having descriptions embedded within other descriptions. For instance, the rule shown in FIG. 6 will be satisfied if the message is from any person with a job title that includes "vice president." To apply this rule, the system checks to see whether the string in the From field of the message is the same as the Name of any Person object in the knowledge base that satisfies the description.

Navigating Through the System

The starting point for navigation through the Object Lens system is the Object Lens Icon, a window that shows whether the user has new mail waiting and includes a menu item to Show Basics (show the basic folders included in the system). The system folders accessible through the Show Basics action include: (1) a folder containing all the other folders in the system, (2) a folder containing all the Templates defined in the system (FIG. 3), (3) a folder containing all the agents defined in the system, (4) a folder for each object type containing all the instances of that type in the system, and (5) the New Mail folder, into which new mail retrieved from the mail server is automatically inserted. In addition, we have designed but not fully implemented two other folders: (6) Everything, a virtual folder containing all objects in the system, and (7) Orphans, a virtual folder containing all objects to which no links exist.

These basic folders provide users with convenient starting points for locating any object in the system. In relatively small systems, users can browse through these folders directly. In larger systems, we expect that users will let their agents search through the system folders to find objects that meet certain criteria. It is also possible for (a) individual users to create their own customized "directory" folders that contain the folders and other objects they most often use, and (b) applications developers to create folders containing the objects used in their application.

Saving and Sharing Knowledge

One of the important efforts we are pursuing in the Object Lens system involves different ways for people to save and share the kinds of knowledge described above. For instance, we are currently experimenting with linking Object Lens to a remote database server that contains large shared relational databases. This work is still at an early stage, but it is clear that the usefulness of Object Lens will be significantly enhanced if it includes access to shared databases. In the current version of Object Lens, we have preliminary solutions to the problems of saving and sharing knowledge that meet some, but not all, of the needs people will have in this area.

Saving knowledge.

Users can save an object (or collection of objects in a folder) at any time by performing the Save action on the object (or the folder). This action uses the file package commands from the underlying Loops and Lisp systems to store the objects in permanent files in a form that can be reloaded at any time. There is also a "Save" action on the main Object Lens icon that saves all the instances in the workstation.

The potential disadvantages of this approach to saving knowledge are that (1) it requires explicit user actions to save objects to permanent storage and (2) it requires all knowledge used by the system to be loaded onto the local workstation. Sharing remote databases will, of course, help solve these problems, but we expect that systems like Object Lens can be of value even without shared databases. For example, many users are already accustomed to explicitly saving their work in applications such as word processing, and even this task can be simplified by creating agents to run periodically (e.g., every night) and do automatic backups of selected objects.

Sharing knowledge by sending messages.

There are two ways users of Object Lens can share objects with each other: (1) by sending messages, and (2) by transferring files. When an Object Lens user sends a message, the message object is converted into text and sent via the existing mail system. Any connected electronic mail users can receive and read this textual message. When an Object Lens user receives the message, it is added as a new object in the receiver's knowledge base.

When a user sends a message containing an embedded object that is expanded (as in FIG. 2), the embedded object is converted into (indented) text in the message in a form that (a) can be easily read by any receivers who are not using Object Lens, and (b) is reconverted into another embedded object when it is received by Object Lens users. When a user sends a message containing embedded objects that are not expanded (e.g., that are shown only as link icons), the names of the objects are included in the message in place of the link icons, but these names are not resolved back into icons at the receiver's end. However, certain types of messages, called "envelopes," arrange to transfer copies of unexpanded, embedded objects to the receiver's work station by automatically saving and loading them.

One intriguing research direction here involves how to communicate embedded objects in such a way that they can be resolved into pre-existing objects at the receiver's end. For example, if the sender's message contains a link to a person object, it would be nice for the receiver's system to be able to automatically resolve this link into the receiver's object representing the same person.

Sharing knowledge by transferring files.

The second way for users to share objects is by transferring files. As described above, it is easy for users to store on a file server the current state of a set of objects. Other users can then load these files to create (or update) the objects in their own workstations. Saving and loading these files can often be done automatically, such as by using an "envelope" object. For example, we expect that a common way for users to keep current versions of shared information such as names, addresses, and job titles of people in their organization will be to have someone maintain the official version of this information and periodically distribute updates to other users in the organization. Distributing these updates could be done in several ways: (1) the "maintainer" could have automatic agents that periodically store the current versions on a file server and the other users could have automatic agents that periodically load the most recent versions, or (2) the maintainer could explicitly send out messages announcing the availability of files containing updated objects and the other users could have agents that automatically load the files announced in such messages (e.g., a rule might load all files specified in "Official file update" messages from the official maintainer).

One potential problem with this approach is that any changes the users have made to their local copies of objects (e.g., any notes they had added in the Comments field) will be lost when a new version of the object is loaded. To help solve this problem, we are currently investigating more specialized updating actions for agents to use. With this approach, the official maintainer will be able to distribute update messages that specify changes in particular fields of particular objects. Users can then set up agents that make these updates automatically under most conditions, but under certain conditions the user might be notified before the update is made (e.g., if the field about to be modified has previously been changed by the user). In some cases, the user might want to have the change made automatically but also be notified (e.g., if someone in the user's group is changing phone numbers).

Object Lens as a Network User Operating Environment.

Figure 21A:
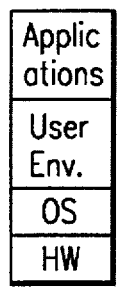
FIGS. 21A–21C presents models of user operating environments in accordance with the prior art and with a referred embodiment of the invention.
Figure 21B:
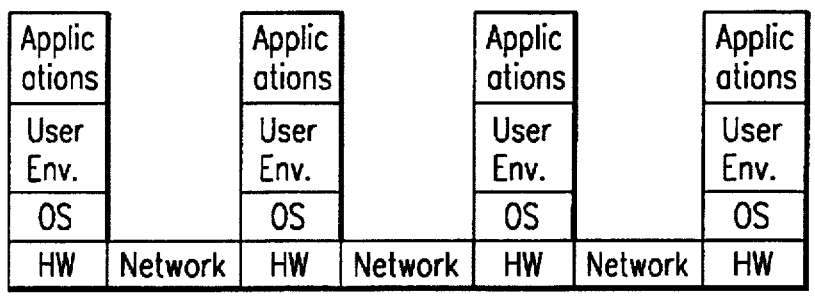

User Operating Environments have been around for many years. A traditional model of a user operating environment is shown in FIG. 21A. An application is launched from within an operating environment, which runs on top of the Operating System, which controls the hardware. The Macintosh Finder(™) is an example of this model. With the advent of networks, this simple model evolved to incorporate the new hardware, as shown in FIG. 21B.

Figure 21C:
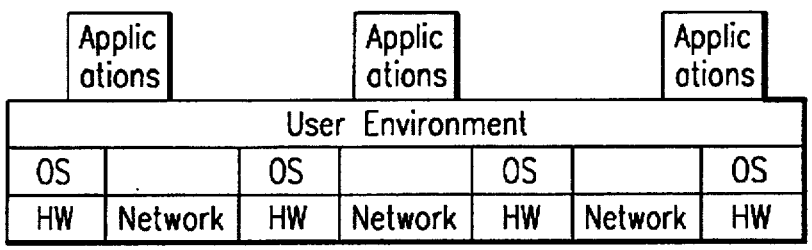
Figure 22:
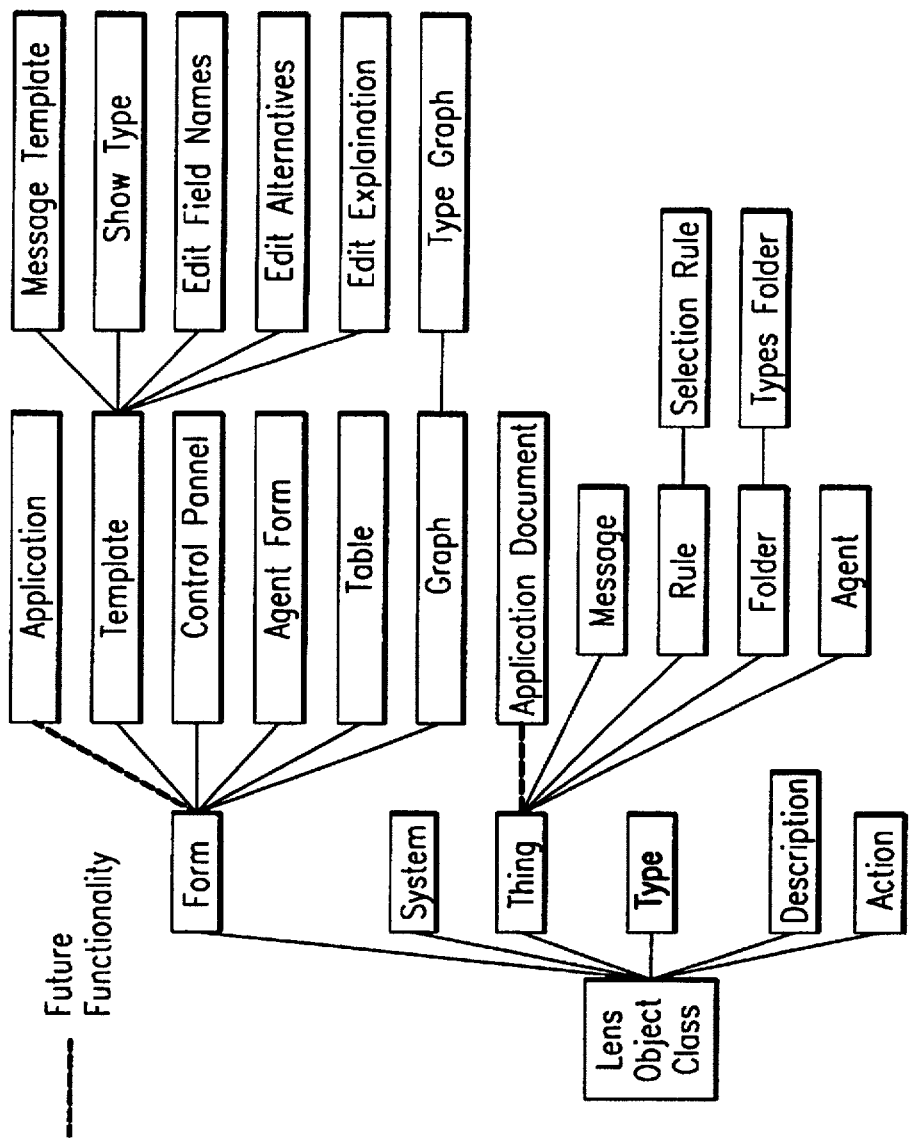
FIG. 22 illustrates object oriented programming object classes in accordance with a preferred embodiment of the invention.
Figure 23:
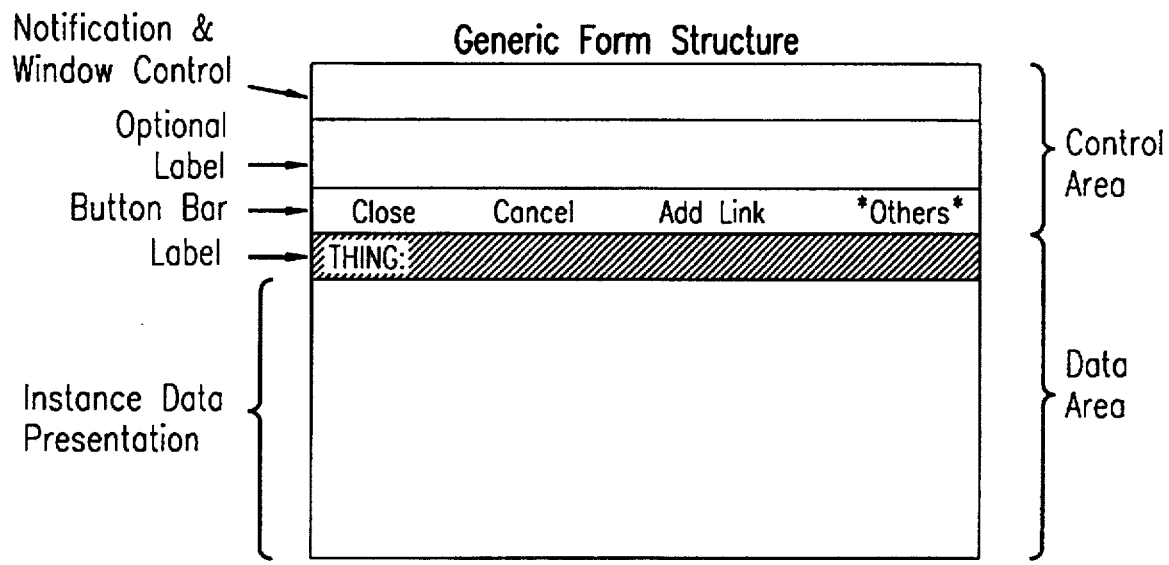
FIG. 23 illustrates the structure of a form in accordance with a preferred embodiment of the invention.
Figure 24:
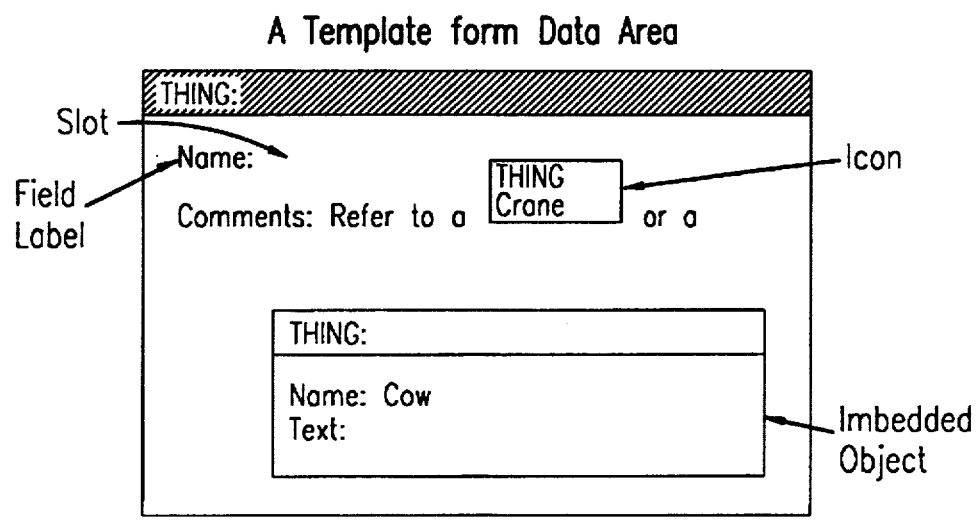
FIG. 24 illustrates an example of template form data in accordance with a preferred embodiment of the invention.
Figure 25:
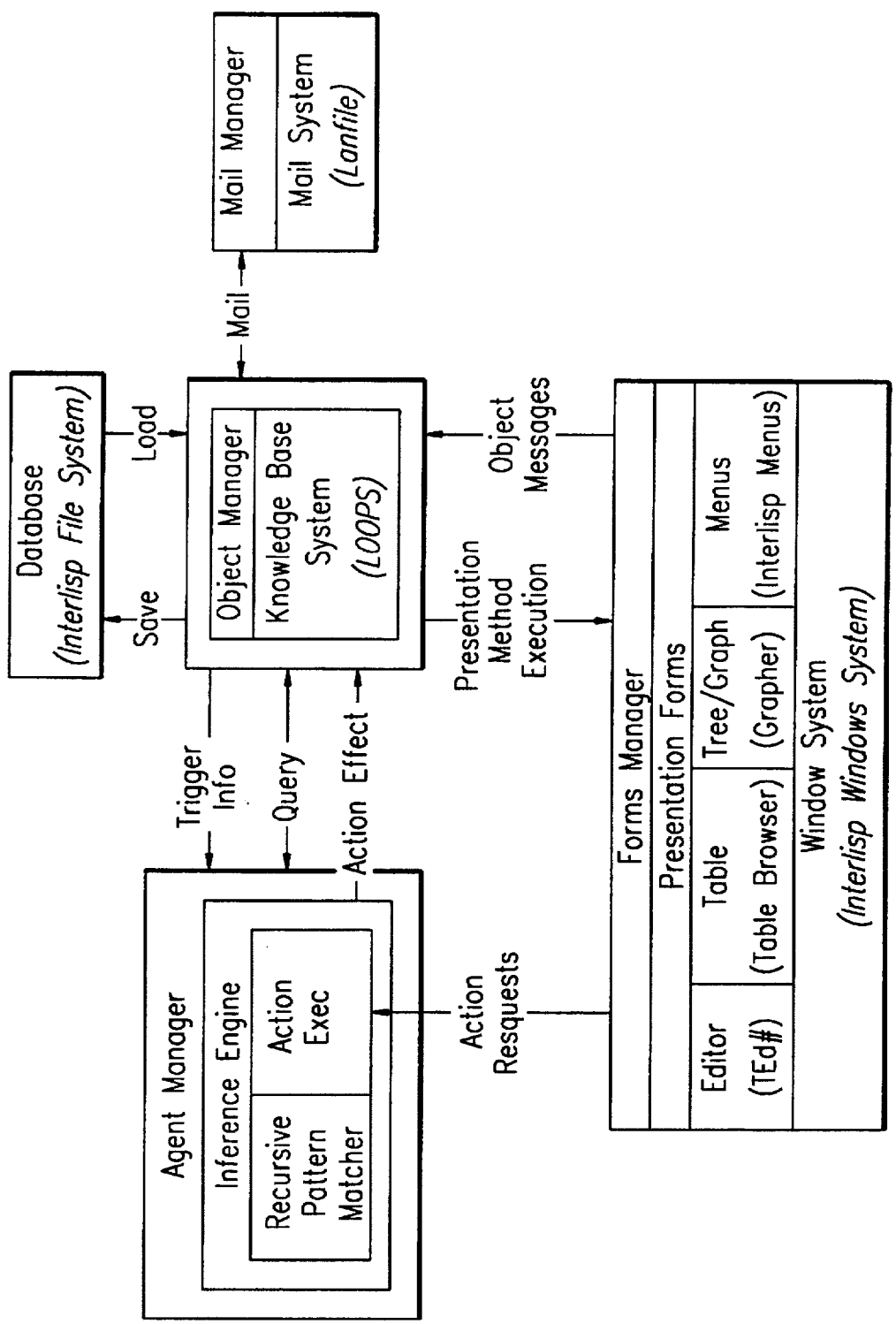
FIG. 25 shows the modular architecture of a preferred embodiment of the invention.

Users are able to take partial advantage of the network by working through new applications such as terminal emulators, electronic mail, and distributed database systems. However, the full benefits achievable through the network await a new model, as shown in FIG. 21C. By creating a common, connected user environment, Object Lens permits users to share information and coordinate activities more fully than with prior art systems.

3. OTHER APPLICATIONS

In this section, we will give more examples of how the above features can be combined to create a variety of cooperative work applications.

Task Tracking

One frequently mentioned capability for cooperative work applications is the ability to keep track of the tasks people are supposed to do (e.g., Winograd & Flores, 1986; Sluizer & Cashman, 1984). For instance, such systems can help answer questions like: What tasks have other people requested me to do? Are any of these tasks overdue? What tasks have I requested other people to do for me?

It is a straightforward matter to support capabilities like this in Object Lens. For instance, the system already includes message types for action requests and commitments. Even in the Information Lens, it was possible to automatically sort these messages into folders according to who is to perform the task, which project it involves, and so forth. In the Information Lens, however, the summary display of a folder's contents shows only the standard message header fields: From, Date, and Subject. To see more about the tasks, individual messages have to be displayed, one at a time. In Object Lens, the messages within a folder can easily be summarized by displaying whatever fields the user chooses. For example, FIG. 8 shows a table display of action request messages that includes the action deadline.

Intelligent Message Sorting: Engineering Change Notices

An intriguing example of a cooperative work problem involves disseminating information about changes in product specifications (often called "engineering change notices") to the appropriate people in the organization. It was already possible in the Information Lens to sort engineering change notices according to the contents of fields such as Part Affected, Type of Change, and Severity. In Object Lens, it is possible to use additional knowledge to do even more intelligent sorting. For instance, FIG. 9 shows a rule that uses a doubly embedded description to select all change notices that involve parts for which anyone reporting to a particular manager is responsible.

Database Retrieval

There are clearly many cases in both individual and cooperative work when it is useful to be able to automatically retrieve from a database objects that satisfy certain conditions. Object Lens provides a simple way to perform database queries: Users can simply create agents that scan the objects in one folder and insert links to selected objects into another folder. The rules in the agents specify the criteria for selecting objects.

Figure 10:
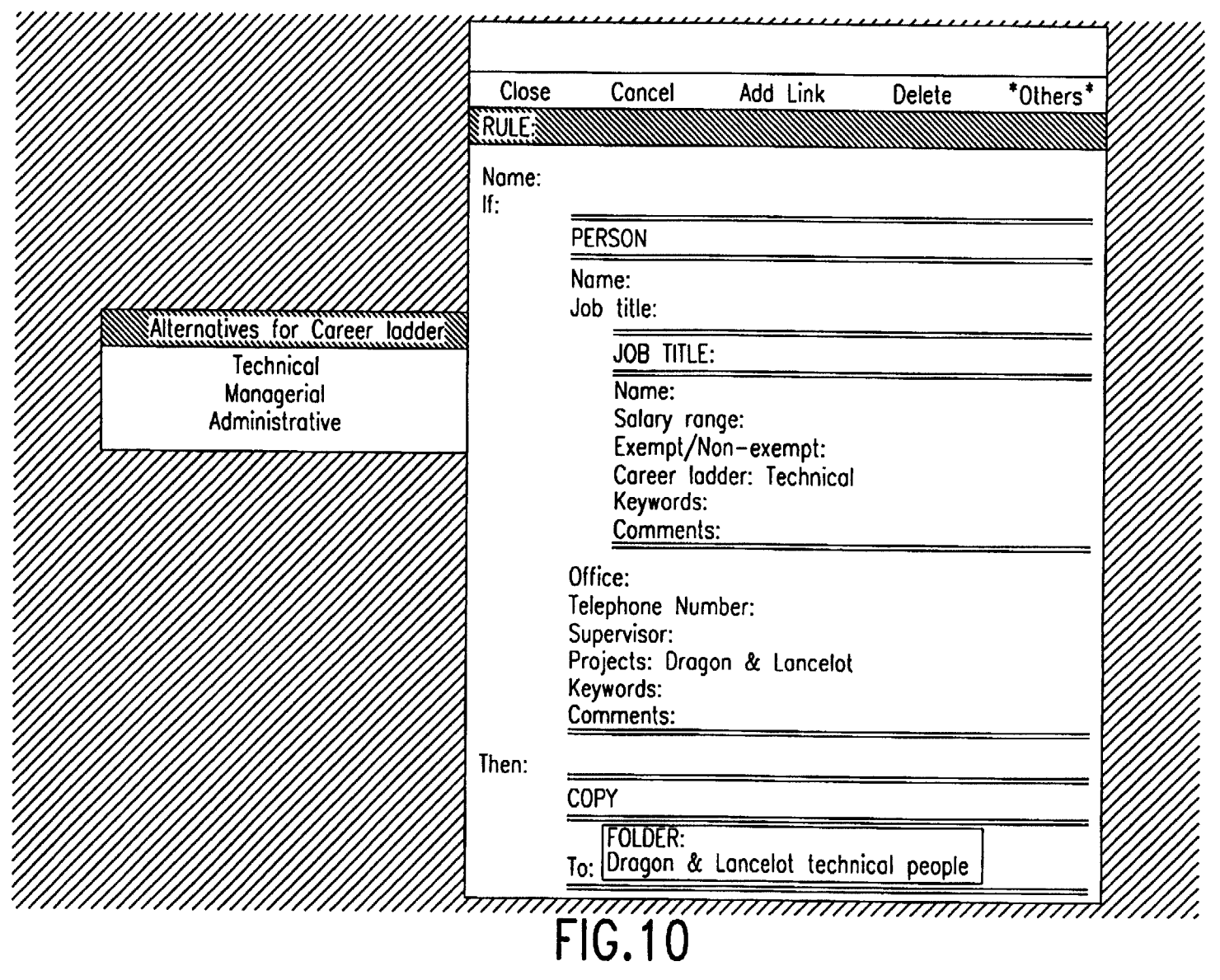

For instance, suppose you wanted to find all the technical staff members who were assigned to both the project code-named "Dragon" and the one code-named "Lancelot." FIG. 10 shows a rule that would retrieve all such people. Instead of listing all the technical job titles by name ("software engineer," "systems programmer," etc.), the rule includes an embedded description to determine whether a particular job title is on the technical, as opposed to the managerial or administrative, career ladder.

In addition to this general interface for database retrieval, we have also implemented a specialized feature in Object Lens for determining the recipients of messages. With this feature, descriptions (like that shown in the IF field of FIG. 10) can be embedded in the TO and CC fields of a message. Then, when the message is sent, these descriptions are automatically applied to all the Person objects in the local knowledge base and the resulting people are inserted in the TO and CC fields. This feature allows senders to create distribution lists that are dynamically computed at message-sending time based on the current information about people in their data base (see Zloof, 1981 for a similar capability).

Hypertext

Figure 11:
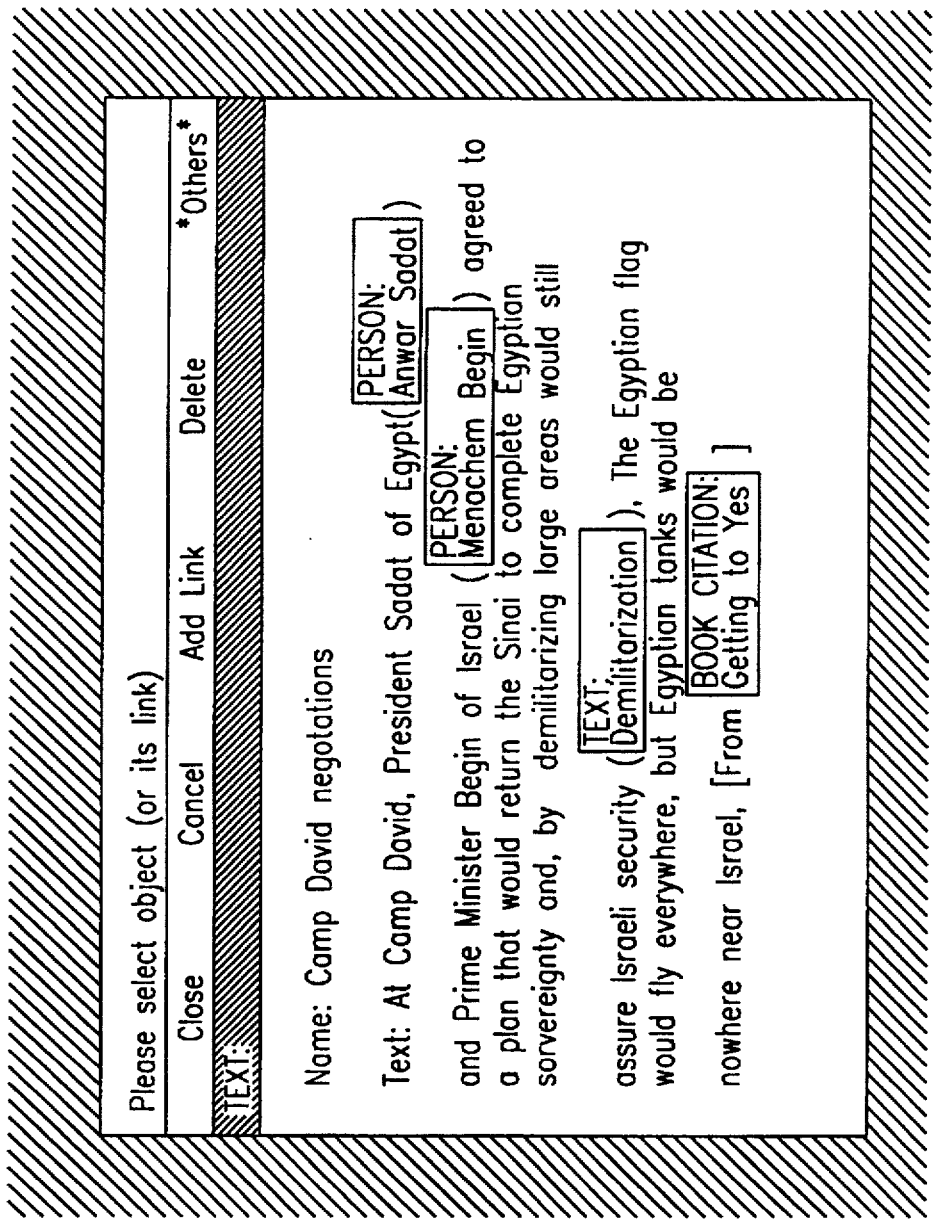
FIG. 11 illustrates, in a preferred embodiment, how an object may be a hypertext document that can include links, not only to other text passages, but also to other object types such as people and bibliographic citations.

As noted above, it is a straightforward matter to use many of the features of a hypertext system in Object Lens (e.g., Halasz, Moran, & Trigg, 1987; Garrett, Smith, & Meyrowitz, 1986; Delisle & Schwartz, 1986). For instance, our system currently contains an object type called Text that displays only two fields: Name and Text. The Text field of a Text object can contain links to as many other objects as desired. For example, FIG. 11 shows a sample Text object that contains links to people and bibliographic citations as well as to another Text object.

In addition to the usual benefits of hypertext systems, Object Lens derives additional benefits from its integration of hypertext with other database, messaging, and computational capabilities. For instance, in order to insert a link to another node in a hypertext system, a user must first find the node to which the link will be made. In Object Lens, the database retrieval capabilities described above can be used to automatically find objects (such as people or bibliographic citations) that satisfy certain criteria. Then links to these objects can be inserted into the text. One desirable feature found in some hypertext systems that is not yet included in Object Lens is the ability to show and follow the incoming links to an object. We would like to implement this capability as another action available on all objects.

It is interesting to observe that Object Lens appears to have some functionality in at least four of the seven areas that Halasz (1987) listed as being needed in the next generation of hypermedia systems (search and query, computational engines, collaborative work, and tailorability).

An Example: Representing the Structure of Arguments

To illustrate the benefits of adding semistructured objects to hypertext, we will describe an increasingly powerful series of sample applications in Objects Lens, each adding a class of benefits not present in the ones before. All these sample applications are designed to help people represent and manipulate the structure of arguments. For instance, a team of programmers designing a new computer system might use such applications to represent alternative design choices, the arguments for and against each one, and the rationale for the choices finally made. The application could thus help make the decision rationale for later reference, such as when the program is being modified.

A number of systems have been built or proposed to provide this general kind of functionality |Conklin & Begeman, 1988; Stefik, Foster, Bobrow, Kahn, Lanning, & Suchman, 1987; Lowe, 1986; Smolensky et al, 1987; Lee, 1989). Our examples will be modeled primarily on the gIBIS system, since it is a recent and appealingly simple example of this class of systems.

Our primary purpose here is not to extend the state of the art in argumentation systems, but to show how easily many of these capabilities can be implemented in a general framework like ours that include semistructured objects. In all but the very last examples, these capabilities can be implemented in Object Lens by knowledgeable end users in a matter of minutes or hours, with no special programming required. For example, our first implementation of most of these capabilities required less than two hours and used only the features of our system that are exposed to non-programming users.

Step 1

"Simple" Hypertext

Figure 12:
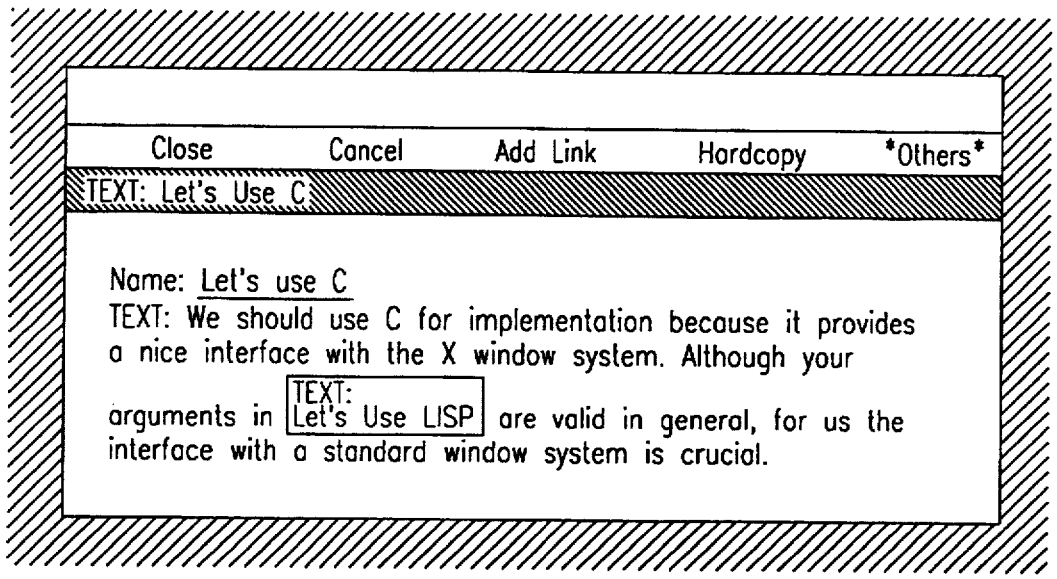
FIG. 12 illustrates, in a preferred embodiment, another hypertext example.

FIG. 12 shows an example of how a "simple" hypertext system might support our argumentation application. This example is from the Object Lens system, but it uses only unstructured text nodes and links between nodes. Note that it is entirely up to you, the user of this system, to structure the information in the node and to put in the proper links. (In this example, and throughout the discussion in connection with FIGS. 12–20, we will use "you" to refer to users when that simplifies the explanation of system features.)

Step 2

Creating Individual Nodes

Figure 13:
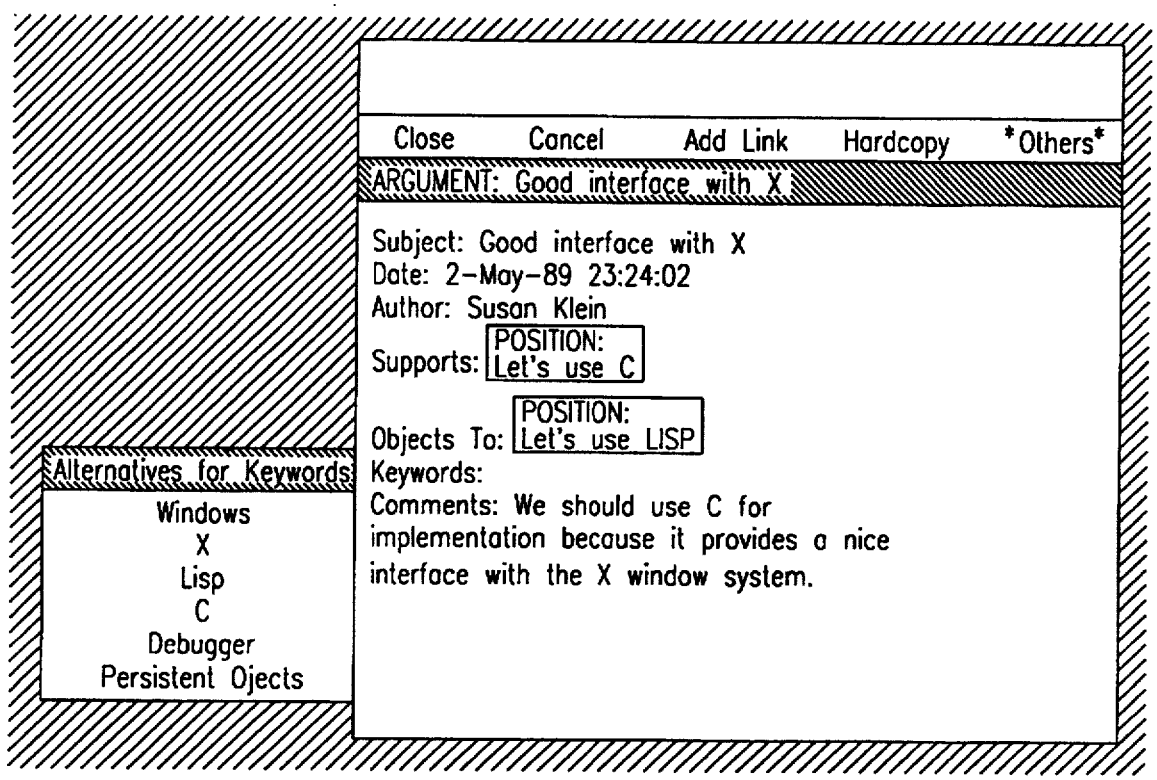
FIG. 13 illustrates, in the context of the systems of FIG. 12, an argument node.

The next step in our series is to create semistructured object types that are appropriate for our application. For instance, the gIBIS system has three types of nodes: Issues, Positions (about an issue), and Arguments (which support or object to positions). FIG. 13 shows an argument node that supports one position and objects to another one. The relationships between this node and the positions to which it refers are represented by links in the appropriate fields ("Supports" and "Objects to", respectively). When users click on a field name, a menu pops up containing suggested alternatives for that field. For instance, when you click on the Keyword field a list of suggested keywords appears and if you select one, it is automatically inserted in the field.

To define the new node types (Issue, Position, and Argument), you specialize existing object types. For instance, you can create the new node types as specializations of Thing. To do this, you select the "Create Subtype" action on the type definition for Thing and then use the "Add Field" action on the new type to add the new fields (e.g., Supports, Objects to, and Author) that are present in this type, but not in Thing. In this case, the user also used the "Edit Field Names" action to rename the "Name" field (that was inherited from Thing) to be "Subject". To change the alternatives that are suggested by the pop-up alternatives menu, you can use the "Edit Alternatives" action. This action allows you to either directly edit a list of alternatives for a field, or to specify a folder whose contents at run-time will be displayed as the alternatives.

At this point, the system helps you create nodes with appropriate fields and alternatives, but it doesn't help you view the structure of the argument as a whole.

Step 3

Summarizing the Contents and Relationships in Groups of Objects

The next step is to add ways of displaying the overall structure of the argument using customizable folders. The original gIBIS system has a graphical browser that shows a tree format display of the nodes in the argument, and FIG. 14(a) shows a similar display from Object Lens.

To create such a display in Object Lens, you can simply put all the nodes you wish to have displayed into a folder, select the "tree" display format for the folder, and select which links you want to have shown in the tree. For instance, in FIG. 14(a), the user chose to display links from the Supports, Objects to, and Responds to fields. As the figure shows, links from each of these different fields is shown with a different kind of line (e.g., solid, dashed, etc.). (Note: It is more convenient to specify the display format for this folder if you first create an abstract type, say "gIBIS Node," whose specializations are Issue, Position, and Argument, and which contains all the fields contained in any of its children.)

Figures 14A, 14B:
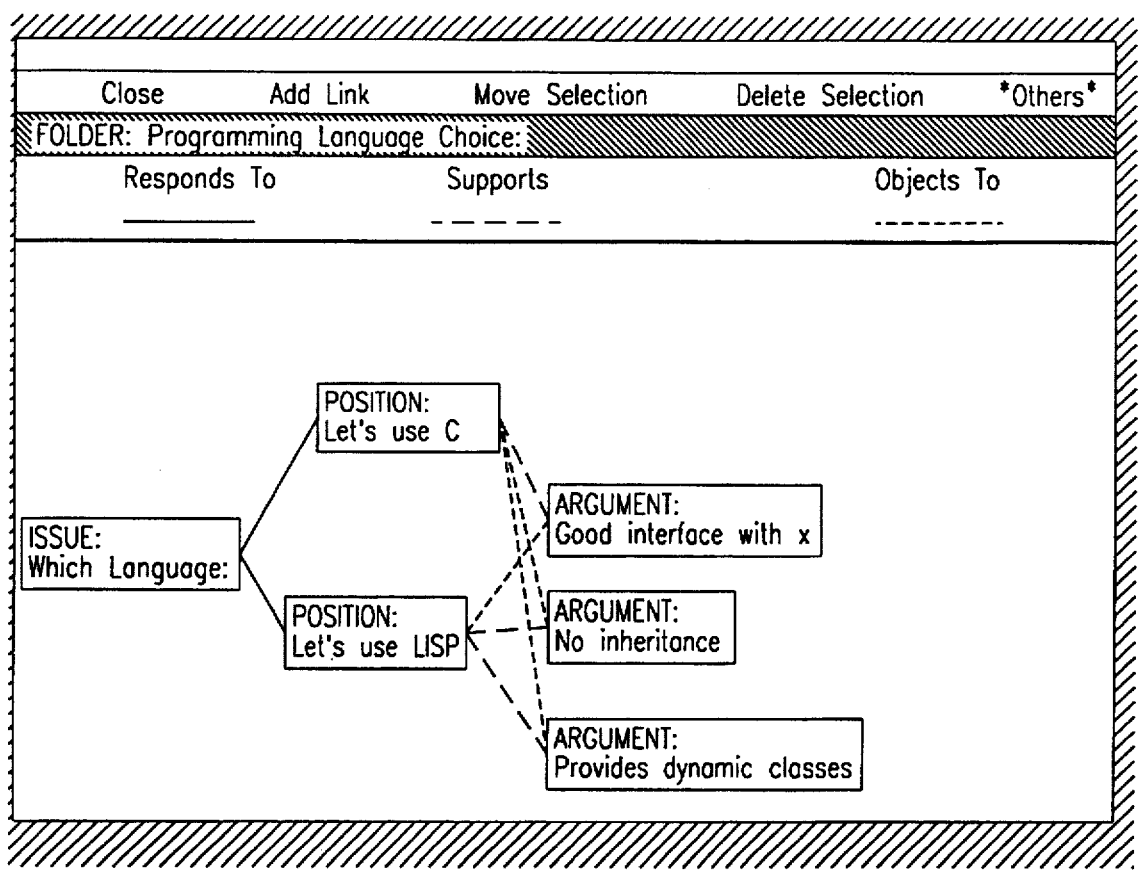
FIGS. 14(a) and (b) illustrate tree and table display formats in the same context.

It is also easy to display the same nodes in a table format display, selecting whichever fields you wish to be shown in the table (see FIG. 14(b). FIG. 15 shows an additional feature of folders: the ability to select objects from another folder to be inserted into this one. For instance, the selection rule in FIG. 15 selects all the counterarguments to a specific position.

At this point in the example, the system has most of the basic user interface functionality of the original gIBIS system. (Unlike the original gIBIS system, however, we have not implemented connections to a remote database server, nor have we hardened the system to the point where it can be used reliably by a large group of people.)

Step 4

Automatically Selecting and Manipulating Objects

Figure 16:
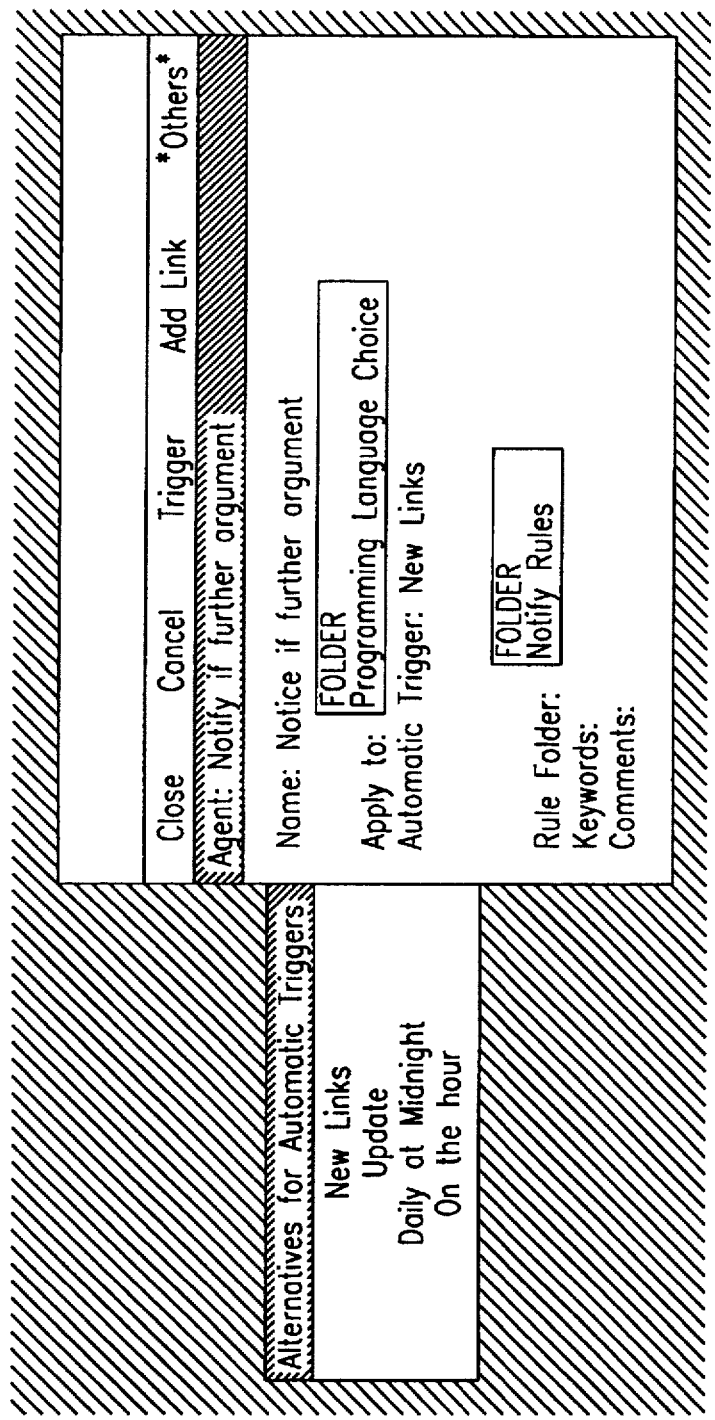
FIG. 16 illustrates the use in this context of an agent to notify the user when arguments have been added.

The last step in our example is to add intelligent agents to help search and modify the network of nodes. For instance, FIG. 16 shows an agent like one you might use to notify you whenever people add arguments that support positions you have entered. This agent is triggered automatically when new objects are added to the folder containing the discussion of interest. FIG. 17 shows the rule this agent uses to select the arguments that support a specific person's positions. This rule illustrates how embedded descriptions can be used to specify structural queries that depend on the link structure in the network as well as on the contents of individual nodes. FIG. 18 shows another (multiply embedded) rule that selects arguments that object to positions authored by people in a particular group (i.e., people who have a specific supervisor). This rule illustrates how queries can use information from throughout a user's knowledge base (such as knowledge about people and their supervisors).

Specialized Display Formats

Calendar

Most of our work so far has used two display formats for folders: tables and trees. These formats are applicable to a very wide range of object types and relationships. It is also possible, however, to create more specialized folder display formats for special kinds of objects. For instance, FIG. 19 shows a specialized display format called "Calendar." The calendar format is used to display objects of type "Event". All events (including specializations such as Meeting and Seminar), contain fields called "Date," "Start time," and "End time." When events are displayed in a calendar, these fields are used to locate the event in the proper day of a month (FIG. 19(a)) and at the proper item within a day (FIG. 19(b)). Users can select a month display like that in FIG. 19(a); they can click on one day within the month display to bring up a day folder like that in FIG. 19(b); and if they display an event within the day folder, the event itself is shown as in FIG. 19(c).

Automatic Agents for Searching and Manipulating Networks

In addition to summarizing the contents of semistructured objects, the system can use their structure to perform even more powerful automatic actions such as searching and restructuring. The Object Lens system uses rule-based agents to perform these automatic actions. For example, FIG. 20 shows an agent that maintains a folder of "Overdue Tasks." Every night at midnight, this agent is automatically triggered and searches the "*All Tasks" folder, a system-maintained folder that contains all task objects in the local workstation. When the agent finds tasks whose due date has passed, it moves them into the Overdue Tasks folder.

4. SYSTEM ARCHITECTURE

What is "Object-Oriented"

Object Lens is an objected oriented, event-driven program. An event-driven program is one where what goes on in the program is driven by user acts (keyboard, mouse, etc.) or other external acts (e.g. the arrival of mail). An object-oriented program has the following characteristics:

Data is encapsulated within objects which insulate the user from the details of how that data is accessed.

Each object is a member of a class. Classes are organized into an entangled hierarchy. Thus, each class has a super-class or parent from which it inherits certain characteristics and methods which instance-objects of the class use for retrieving, changing, or presenting the data in the object.

In an object-oriented program, the program "flow" consists of objects sending messages to each other. Each message, in essence, asks the object to invoke a method designed to respond to that message. Thus an object sent a "Tell-me-the-value-of-your-name" message would invoke a method which is part of the object's class (and which may have been inherited from the object's class's parent) to determine the object's name and deliver it to the message's sender. Similarly, an object sent a "Display-yourself" message would invoke a method belonging to or inherited by the object's class which can present the data in any instance of the object's class.

Overall Architecture

The Object Lens system can be thought of as having a number of modules which perform specific tasks. These modules and their relationships are illustrated in FIG. 16.

Object Manager

The heart of Object Lens is the Object Manager. Currently built on top of LOOPS, the Object Manager is responsible for keeping track of all classes and class-instances and their links to each other. It also keeps track of the current state of each object and helps the objects handle messages which they receive by providing support functions for their methods. The Object Manager provides the Forms Manager with the information it needs to present a form. The Object Manger also handles saving and loading objects from permanent storage in the database. In the future, the Object Manager will work with a shared database to do object locking and version control.

Forms Manager

When an object receives a "Present Yourself Using Form X" message, it executes the appropriate presentation method by calling the Forms Manager. The Forms Manager also handles user-events addressed to displayed forms and, where necessary, translates them into messages addressed to the appropriate object(s). Examples of messages include:

| | |
|---|---|
| Show | Generated by left-buttoning on a hyper-link icon. Note that when a Present Yourself message does not contain a reference to a specific form, the default form is used. The All Templates form sends a form type to the Class-object when telling the Class-object to present itself. |
| Update Object | Generated when a form is Closed or Shrink-ed. |
| Execute "Add Link from Y to X" | Sent to the Action after the Forms manger has determined the linked object. |

The forms manipulated by the Forms Manager are built on top of a set of complex human-interface toolkit objects, which are, in turn, built on top of a window system. While the current implementation of Object Lens uses the toolkit procedures available on the Xerox InterLisp Workstation, the concepts are intended to be portable to other environments, such as X-Windows.

Agent Manager

The Agent Manager knows about each agent's automatic triggers. It includes processes that watch for time-based triggers and receives messages from the Object Manager about New Links and Object Updates. It also receives messages from the Object Manager about agents which have been manually triggered.

Triggering an agent causes the agent to perform its "trigger" method. It does this by determining to which folder it applies, picking out each object in that folder sequentially and telling the rules in its rules folder to apply themselves to the object. Rules use a recursive pattern matcher to determine if an object matches the description contained in the rule's left hand side, and if so sends an "Execute" message to the actions on the rule's right hand side.

The recursive pattern matcher compares the description on the left hand side of a rule to a particular object. If the type is the same (or the object is a sub-class of the description's type), the pattern matcher performs a case-insensitive, substring match against the contents of the description's field. If a description-field contains an embedded description and the object being matched has an object within the same field, the pattern matcher calls itself to see if the embedded description matches the linked object.

Mail Manager

The mail manager handles incoming and outgoing messages. It translates incoming E-Mail into Object Lens objects and accepts the "message stream" produced when an object executes its "send" method. The current Mail Manger is built on top of the Xerox Lafite system, but could be built on top of other mail systems.

In the future, the Mail Manager will also coordinate the shipping of objects between disjoint Object Lens installations.

Database

Currently, permanent storage of objects is only through ASCII files which must be saved and loaded.

Lens Object Classes

In Object Lens, the internal object-class structure is designed to reflect the objects with which the user may interact. The pre-defined object classes in the system are shown in FIG. 12.

All Lens Object Classes have internal attributes which are used when creating instances of the Class. In addition, Lens Object Classes have methods which are used to manipulate the data in the class's instances. In particular, Lens Object Classes have presentation methods called Forms. Each Class may have one or more Forms; the Form that is displayed depends on the context in which the Class-instance is being shown and on the which Form is considered to be the default for that Class. All internal attributes and methods of a parent-class are inherited by its child-classes.

We will go through each object class and describe its attributes and presentation methods (Forms).

Form

All objects in object lens are presented through forms. While most objects, including classes, have only one form through which they may be presented, instances of some types can be presented through multiple forms. Forms consist of two parts: the control area and the data areas; forms differ primarily in their data areas.

The control area is at the top of the form. The upper part of the control area is where the Form Manager places notices and user prompts and is also used to move and re-size the form's window.

The lower part of the control area has "buttons" for commands which affect either the form itself or the object(s) shown in the data area(s) of the form. It also has a button called "*Other*" which pops-up a menu of less frequently used commands. Forms maintain ordered lists of commands. The one of these lists which is "active" is used to determine what commands will be available: The Form Manager puts as many of the items on the active list onto the button region as will fit, given the window size. The rest are put into the *Other* menu.

When an object receives a request that it "show" itself, it first determines what form it should be presented through. (Note: the generalized method of using forms as described here is not yet fully implemented in our prototype system.) If an appropriate form was not specified in the message, the object picks its default form. The object then asks the object manager to create or re-use an existing form-instance of the appropriate class. The object then sends a *Show message with all the appropriate object-data to the form instance. From then until an Update Object message is sent to the form, the user interacts with the data in the form and not with the original object. The form determines which list is active by looking at the value of one or more fields in the object to be displayed. This allows the form manager to present different command options depending on the value of status attributes of the object being displayed. A form may have zero, one, or more data areas. At the top of each data area is a label; below the label is where the data about the instance is presented. Form, like other classes, may be sub-classed; many different sub-classes of Form are described below. Currently, the user cannot create Form sub-classes. However, this will change in the future.

System

System (or "Executive") is a class of which there is, currently, only one instance-object. The Form for the System instance is a Control Panel, which has no data area. The form's command list has six items; the *Other* button is re-labeled "Show Basics." The default window-size allows only the first of these commands to be shown on the Button Bar:

| Get Mail | Tells the Mail Manager to get any new mail which may have arrived from the mail server and to put it into the folder New Mail. |
|---|---|
| All Agents | Finds all agents in the system and places them in the folder All Agents. |
| All Folders | Finds all folders in the system and places them in the folder All Folders. |
| All Templates | Finds all types in the system and places them in the folder All Templates, which is an instance of Types Folder (see below). |
| All Instances | Finds all instances of some sub-class of Thing in the system and places them in the folder All (name of sub-class). |
| New Mail | Brings up the *New Mail folder. |

Thing

Thing is a class which has a meta-class called Type. Looked at another way, Thing and its sub-classes are both classes and types (instances of Type). While this may seem confusing, it is both important to understand and very powerful. Because users can create instances of Classes, and because Type is a class, users can create types. Since Thing and its sub-classes are types, users can "sub-class" Thing. This is done through a "types folder," which allows users to create types which are sub-classes of Thing. As shown in FIG. 13, Thing's predefined sub-classes include Message, Rule, Folder, and Agent, which are discussed in detail below. However, it is part of the power of Object Lens to permit the definition by the user of a type of which an instance may be a conventional data record.

Naturally, user-made types inherit their parent type's Forms and attributes. Users can create any number of instances of any type. Instances of each of these classes behaves in the same way as instances of Thing, except that the number, nature, and name of each of the fields may be different. Types can have any number of fields and use, by default, the "Template" sub-class of Form.

As shown in FIG. 15, Thing starts out with two shown fields: Name and Comments. The Keywords field is not displayed in this form.

A template is a form in which the data-area consists of a series of field-labels followed by slots into which data may be entered. Into these slots the user may enter both free text and icons which serve as a hypertext-link to another object.

A slot can also contain an embedded object which appears as the data-area of a template for another object. Such an embedded template is a hyper-textual link to another object; the other object can be edited right there within the template for the linking object. A link to another object can be displayed either as an embedded template or as an icon, depending upon the Is-It-Expanded attribute of the field.

Mousing left on the field labels pops-up a menu of alternatives for the field's value. Mousing middle on the field label gives the user access to the explanation, default value, descriptions, and alternatives for that field.

A template's command list contains the following commands:

| Close | Saves any changes made in the form as changes to the object instance and then close the window. |
|---|---|
| Cancel | Close the window without saving any changes made. This essentially aborts any changes made to the object through the form. |
| Add Link | This changes the user mode to allow the user to select another object the hyper-link-icon for which should be entered at the cursor-mark in the data-area of the form. The cursor changes to a target; clicking on a form, icon, or folder-table item for an object makes that object the linked object. |
| Hardcopy | Prints a copy of the form. |
| Shrink | Closes the form but places an icon for the object on the desktop. |
| Move | Allows the user to move the form's window. |
| Shape | Allows the user to change the shape of the form's window. |
| Save | Tells the object to save a copy of itself to the database. |

Message

Message is a predefined type of Thing which includes two additional shown fields, To: and From:, and renames the first field, Name, which is inherited from Thing, "Subject." The text of the message goes in the second field inherited from Thing.

The message template has two command lists. The first is used when the Creator field of the message is empty (i.e. before the message has been sent); the second, when the field has something in it (i.e. after the message has been received). The first command-list is as follows:

| Close | Saves any changes made in the form as changes to the object instance and then close the window. |
|---|---|
| Cancel | Close the window without saving any changes made. This essentially aborts any changes made to the object through the form. |
| Send | Causes the Message object to be handed to the Mail Manager for shipment. |
| Add Link | This changes the user mode to allow the user to select another object the hyper-link-icon for which should be entered at the cursor-mark in the data-area of the |

| | form. The cursor changes to a target; clicking on a form, icon, or folder-table item for an object makes that object the linked object. |
|---|---|
| Hardcopy | Prints a copy of the form. |
| Shrink | Closes the form but places an icon for the object on the desktop. |
| Move | Allows the user to move the form's window. |
| Shape | Allows the user to change the shape of the form's window. |
| Save | Tells the object to save a copy of itself to the database. |

The second command list is as follows:

| Close | Saves any changes made in the form as changes to the object instance and then close the window. |
|---|---|
| Cancel | Close the window without saving any changes made. This essentially aborts any changes made to the object through the form. |
| Answer | Creates and shows a new message addressed to the sender of the original message and which refers to the original message. |
| Resend | Creates and shows a new message of the same type and with the same fields as the old message except that the address fields are blank. |
| Forward | Creates and shows a new message without an addressee which contains the entire contents of the original message as the new message's text field. |
| Hardcopy | Prints a copy of the form. |
| Shrink | Closes the form but places an icon for the object on the desktop. |
| Move | Allows the user to move the form's window. |
| Shape | Allows the user to change the shape of the form's window. |
| Save | Tells the object to save a copy of itself to the database. |

Naturally, one may create sub-classes of Message. These inherit the additional characteristics of Message.

Rule

A rule has three fields which are shown: Name, If, and Then. The If field takes descriptions as values. The Then field takes actions as values. These actions are pre-wired into the Then field as alternatives.

A Selection Rule is a sub-class of Rule. Instances of Selection Rule can belong to a folder. Other than that, selection rules do not differ from regular rules.

Folder

Folders are containers and are one of the most powerful features of Object Lens. Like Thing, users can create instances of Folder. The most important attribute of folders is that they contain a field which contains a list of links to other objects. Folders also have a type of object that they prefer to contain; the user is asked to identify this type when a new folder is created. Finally, folders can also have a selection rule which can be used as a kind of "agent on special assignment" to collect objects to put into the folder.

Folders can be displayed using instances of a variety of sub-classes of Form. While only two sub-classes have been implemented so far (Tables and Graphs), others, including Calendars, Desktops, and Outlines, will be added in the future.

A table's data area shows a row for each item contained in the folder. The rows are divided into several columns in which fields from the objects are shown. What fields are "shown" are determined by a menu-selection reached through the "Choose Fields to Show" command. Rows may be selected using the left and right mouse button. The user can also use the middle mouse button on a row to bring up a menu with the following context specific options along with any object specific actions:

| Show | Show the contained object in its own form. |
|---|---|
| Hardcopy | Print a copy of the contained object in its own form. |
| Delete | Remove this object from the folder. |

The command list for a table has the following items:

| Close | Close the folder window |
|---|---|
| Display | Show the selected object, unless it is already being shown, in which case, un-burry it, unless it is already un-buried, in which case select then show the next object in the folder. |
| Delete Selection | Removes from the folder all objects which are currently selected in the data area. |
| Add Link | This changes the user mode to allow the user to select another object to include in the folder. The cursor changes to a target; clicking on a form, icon, or folder-table item for an object makes that object the included object. You can only have one copy of each object in a folder so Add Link checks to see if the object is already contained before adding the link. |
| Choose Fields to show | Brings up a multi-pick menu which lets the user choose which object-fields should be shown in the table. |
| Change Link Type | Brings up a multi-pick menu to allow the user to choose the type of object the folder likes to contain. |
| Hardcopy | Prints the form. |
| Move Selected items | Brings up a menu of all the folders in the system. When the user chooses one, all the items currently selected in the data window are linked to the new folder and removed from the current one. |
| Copy Selected Items | Brings up a menu of all the folders in the system. When the user chooses one, all the items currently selected in the data window are linked to the new folder and removed from the current one. |
| Show Selection Rule | Opens a data area below the main data which contains a selection rule specifing which objects will be selected for this folder. A selection rule specifies a Folder to which it will be applied and a Description (i.e., a partially filled-in template) of objects to be selected. |
| Trigger Selection Rule | Collects all objects specified by the rule and links them into the folder. |
| Shrink | Closes the form but places an icon for the object on the desktop. |
| Save | Tells the object to save a copy of itself to the database. |

A graph's data area shows icons for each object contained in the folder. The icons are arranged as the nodes in a graph; the lines of the graph represent the object-field(s) the user tells the graph to "show." What fields are "shown" are determined by a menu-selection reached through the "Choose Fields to Show" command. If more than one object-field is to be shown, the graph displays the lines using different line patterns. The geometry of the graph is determined by the lines and by order in which the objects were entered into the folder.

Icons may be selected using the right mouse button. The user can also use the middle mouse button on a row to bring up a menu with the following context specific actions along with any object specification:

| | |
|---|---|
| Select | Selects this icon and de-selects all others in the folder. |
| Show | Show the contained object in its own form. |
| Hardcopy | Print a copy of the contained object in its own form. |
| Delete | Remove this object from the folder. |

A graph's command list is:

| | |
|---|---|
| Close | Close the folder window |
| Zoom-in | Increases the amount of detail shown on the graph by increasing the distances between the icons. |
| Zoom-out | Increases the amount of the graph which is shown by decreasing the distances between the icons. |
| Delete Selection | Removes from the folder all objects which are currently selected in the data area. |
| Add Link | This changes the user mode to allow the user to select another object to include in the folder. The cursor changes to a target; clicking on a form, icon, or folder-table item for an object makes that object the included object. You can only have one copy of each object in a folder so Add Link checks to see if the object is already contained before adding the link. |
| Choose Fields to Show | Brings up a multi-pick menu which lets the user choose which object-fields should be shown as links in the graph. |
| Change Link Type | Allows the user to change the type of object the folder likes to contain. |
| Hardcopy | Prints the form. |
| Move Selected Items | Brings up a menu of all the folders in the system. When the user chooses one, all the items currently selected in the data window are linked to the new folder and removed from the current one. |
| Copy Selected Items | Brings up a menu of all the folders in the system. When the user chooses one, all the items currently selected in the data window are linked to the new folder and removed from the current one. |
| Show Selection Rule | Opens a second form below the main folder form which contains a rule for what objects from what |
| Trigger Selection Rule | Collects all objects specified by the rule and links them into the folder. |
| Shrink | Closes the form but places an icon for the object on the desktop. |
| Save | Tells the object to save a copy of itself to the database. |

Types Folder or "View" Folder

Instances of Types Folder, such as "All Templates," use instances of a sub-class of Graph called a Types Graph. A types graph differs from other graphs in the behavior of objects in its data-area: the middle button used on an icon representing a type brings up a menu with the following options:

| | |
|---|---|
| Select | Selects the icon; de-selects all others. |
| Create Object | Creates an instance of the type. |

| | |
|---|---|
| Create a Sub-Template | Creates a Class-object which is a sub-class of the icon's Class-object and presents the new Class-object using the Show form. |
| Edit Fields to Expand | Brings up a multiple-select menu which allows the user to select which fields of the instances of type a template will expand into an imbedded template. |
| Edit Fields to Show | Brings up a multiple-select menu which allows the user to select which fields of the instances of type a template will show. |
| Edit Alternatives | Brings up the Edit Alternatives form |
| Edit Field Names | Brings up the Edit Field Names form |
| Edit Descriptions | Brings up the Edit Descriptions form |
| Edit Explanations | Brings up the Edit Explanations form |
| Show | Brings up the Show form |

Using the left button on an icon for a type causes an instance of that type to be created and to be presented sing the type's default presentation form.

Agents

Agent is a pre-defined class of objects. Agents contain a field for:
 the folder to which the agent is to be applied,
 the list of things which can automatically cause the Agent Manager to trigger the agent (such as new links to the folder, the updating of an object contained in the folder, the passing or an hour, or the passing of a day), and
 a folder containing a set of rules.

The commands list of an agent form contains:

| | |
|---|---|
| Close | Saves any changes made in the form as changes to the object instance and then close the window. |
| Cancel | Close the window without saving any changes made. This essentially aborts any changes made to the object through the form. |
| Add Link | This changes the user mode to allow the user to select another object the hyper-link-icon for which should be entered at the cursor-mark in the data-area of the form. The cursor changes to a target; clicking on a form, icon, or folder-table item for an object makes that object the linked object. |
| Hardcopy | Prints a copy of the form. |
| Shrink | Closes the form but places an icon for the object on the desktop. |
| Move | Allows the user to move the form's window. |
| Shape | Allows the user to change the shape of the form's window. |
| Save | Tells the object to save a copy of itself to the database. |
| Trigger | Executes a method which causes all of the agents rules to be applied to all items in the agents's apply-to folder. |

Application Document

This type of Thing has not yet been implemented. However,it offers one model of how documents from other applications could be encapsulated in Object Lens. An Application Document object would have a template-form. However, the form would have an additional command in the control area which would allow the user to select another form to display the document; that form/method would be the document's application. The object itself would only contain a reference to the file-path of the application document in a hidden field. Choosing the other method would launch the application with the document in a separate window.

Type

An instance of class Type is an object which serves as the class definition for another object. In particular, the class Thing and all of its sub-classes are instances of the class Type. A type contains a list of fields. Each field in a thing has several attributes:

| | |
|---|---|
| Field Name | This is a text string. Its value is inherited from the parent class but can be overridden. |
| Default Value | This is the value which is automatically put into the Class-instance's instance field value when the instance's instance is created. |
| Alternatives | This is a list of values which will appear in the alternatives-pop-up menu for the field in the Class-instance's instance's form. |
| Descriptions | This is a list of Class-instances which can be used as a template for pattern matching for this field. |
| Explanation | This is a text string which will be shown by template-forms for instances of the Class-object when the user asks for an explanation of the field. |
| Is it Shown | This is a boolean which determines whether a field is shown in the form for the Class-object's instances. |
| Is it Expanded | This is a boolean which determines whether an object reference contained in the value of a field of an instance of a Class-object should be displayed as an icon or as an imbedded object template-form. |

A type is displayed through a set of forms which are sub-classes of Template and through pop-up menus, each of which allows the user to edit different attributes of the fields. These forms are:

| | |
|---|---|
| Show | Allows the user to edit default values in the slots which would normally be taken up by the values for that field. Command items for this form include: |
| | Close — Described Elsewhere |
| | Cancel — Described Elsewhere |
| | Create Object — Described Elsewhere |
| | Edit Explanations — Described Elsewhere |
| | Edit Descriptions — Described Elsewhere |
| | Edit Alternatives — Described Elsewhere |
| | Edit Fields to Expand — Described Elsewhere |
| | Edit Field Names — Described Elsewhere |
| | Add Fields — Asks for the names of the fields the user wishes to add to the type and then adds them. |
| | Delete Fields — Provides a multi-pick menu of fields in the type and allows the user to select which ones to delete. |
| | Move — Described Elsewhere |
| | Shape — Described Elsewhere |
| Shrink | Described Elsewhere |
| Edit Field Name | Allows the user to enter new field names in the slots which would normally be taken up by the values for that field. Command items for this form include: |
| | Close — Described Elsewhere |
| | Cancel — Described Elsewhere |
| | Move — Described Elsewhere |
| | Shape — Described Elsewhere |
| Edit Alternatives | Allows the user to enter lists of alternatives in the slots which would normally be taken up by the values for that field. If one of the items in the alternatives list is a folder, then the list actually shown by the Class-object's instance will include all the items in the folder. Command items for this form include: |
| | Close — Described Elsewhere |
| | Cancel — Described Elsewhere |
| | Move — Described Elsewhere |
| | Shape — Described Elsewhere |
| Edit Explanation | Allows the user to enter the fields explanations in the slots which would normally be taken up by the values for that field. Command items for this form include: |
| | Close — Described Elsewhere |
| | Cancel — Described Elsewhere |
| | Add Link — Described Elsewhere |
| | Shape — Described Elsewhere |

The user sets whether a field is to be Shown or Expanded through pop-up menus which are available through any of the above forms. The user sets descriptions for a field through a series of pop-up menus.

Description

The Pattern Matcher uses descriptions to identify objects which match the descriptions criteria. A description for a thing is identical in appearance to the template-form for that thing, except the font of the text in the description is in italics. A user can fill-in a description.

Variables

A variable is a special container-object which is useful in descriptions and actions. (Note: this use of variables is not yet implemented in the prototype.) Just like any other object, it has a name and appears as an icon when inserted into another object which is being shown through a template-form. A user can also show a variable through a template-form which is a simple window showing the variable's name and current value. A user may insert a new variable into a description at the selection point by using the Add Link message. When a variable is encountered in a field description during a matching, it is replaced with its value unless it is the first argument of a Set Variable expression. A variable's value may be set in one of two ways. The user may edit the variable through it's form, changing the variable's value and/or name. The user may also include a Set Variable expression in a description. Since Matching is done from top to bottom, the value of a variable at any point in a description (or rule) is equal to the value set by the closest Set Variable expression before or above the current point or, if there are no SetVariable expressions above or before the point, the variable's value external to the description.

Actions

Action are objects which specify processes to be applied to other objects. Actions are associated with particular types of objects. Some actions (such as "Show" and "move") are predefined for specified object types. In future versions of the system, we expect to let users (and application programmers) define new actions for themselves. For instance, it will be possible to define new actions for a specific object type (and its specializations) by writing procedures in a general purpose programming language (such as C or Lisp). We also plan to have simplified programing languages that "non-programmers" can use to define new actions that combining actions already defined.

One possible such language which we have partially specified but not yet implemented is called Object Action Language (OAL). An OAL expression consists of a message, a target object, and the arguments which the message takes. Any user-method for any object may be used as part of an OAL expression. If an expression returns a result (e.g. Create Object returns a pointer to that object), that result is placed in a special variable called "The Result." An OAL expression may also call other actions by sending them an execute message. The THEN field of a rule can also contain OAL expressions which are evaluated when the rule fires. Actions are objects which contain procedures which are executed when they receive a Execute message. The message may be sent to the Action either as a result of a rule's firing or by the Forms Manager as a result of a command's being executed. Procedures are written in terms of a limited set of primitives, such as:

Add Link from folder ( ) to object ( )

Remove link from folder ( ) to object ( )

Set field ( ) of object ( ) to be equal to string/object/result-of-function ( )

Put the value of field ( ) into variable

Create an instance of class ( ) {and store its name in ( )}

Delete object ( ) from virtual memory

Pass object ( ) to the Mail Manager for shipping

Save object ( ) to permanent storage

Retrieve object( ) from permanent storage

Expunge object ( ) from permanent storage

Hardcopy object ( ) {using form ( ) }

Sort folder ( ) on field ( )

Trigger agent/rule ( )

Execute action ( )

The ( )'s can contain either constants or variable names. The current implementation hard-codes all actions and commands. Thus, rules may only execute the actions:

Move this thing to folder ( )

Copy this thing to folder ( )

Remove this thing from this folder

Hardcopy this thing

Resend this thing

Add keywords ( ) to this thing where each action is performed on the "current object" (selected by matching the IF part of the rule) and in the context of the "current folder" (the one to which the agent applies).

Actions do not currently have presentation forms but will, in the future, have editor-forms geared towards procedure development.

Commands

It is useful to distinguish between actions and commands. A command is an instruction given through a form. The instruction may be invoked through the button-bar or through a pop-up menu. Commands may apply to a window, a form, or to one or more objects. Window commands, such as Close, Move, and Shape, are typically accessed through a pop-up menu, are handled directly by the Window System. Form commands, such as Change Display Format, or Edit Fields to Show, or Select are typically accessed through the button bar and are handled by the Forms Manager. Object commands, such as Show, Add Link, Delete, Send, Answer, and Forward can be accessed either through the button bar (when the object of the action has been selected in advance) or through pop-up menus (when the menu is gotten by clicking-middle on the object of the action). Object actions are also handled by the Forms Manager, which translates them into action requests to the Action Exec.

The Delete Selection command is a useful example. After the user has issued a series of commands to the form in order to select a set of objects contained in a folder and being shown by the form, the user goes to the button-bar and chooses Delete Selection. The Forms Manager uses its list of selected objects to translate this command into a series of Delete actions which changes the contents of the folder to remove the selected items. Like actions, commands are also currently hard-coded. Also like actions and forms, in the future, users will be able to write commands and incorporate them into forms.

Detailed Technical Documentation

This section describes the detailed System Specification for the Object Lens system as currently implemented on top of LOOPS in Interlisp D on Xerox Lisp Workstations. It consists of approximately 375 Kb of unique source code, independent of the system code (Interlisp, LOOPS, Lafite, TEdit, Grapher, TableBrowser) upon which Object Lens is based. The unique executable code takes up about 250 Kb of virtual memory; the starting knowledge base takes up about another 15 Kb. Because Object Lens is implemented using object oriented programming, the system architecture must be understood in terms of the classes of objects which have been established.

Organization of the LOOPS Classes in Object Lens

Figure 26A:
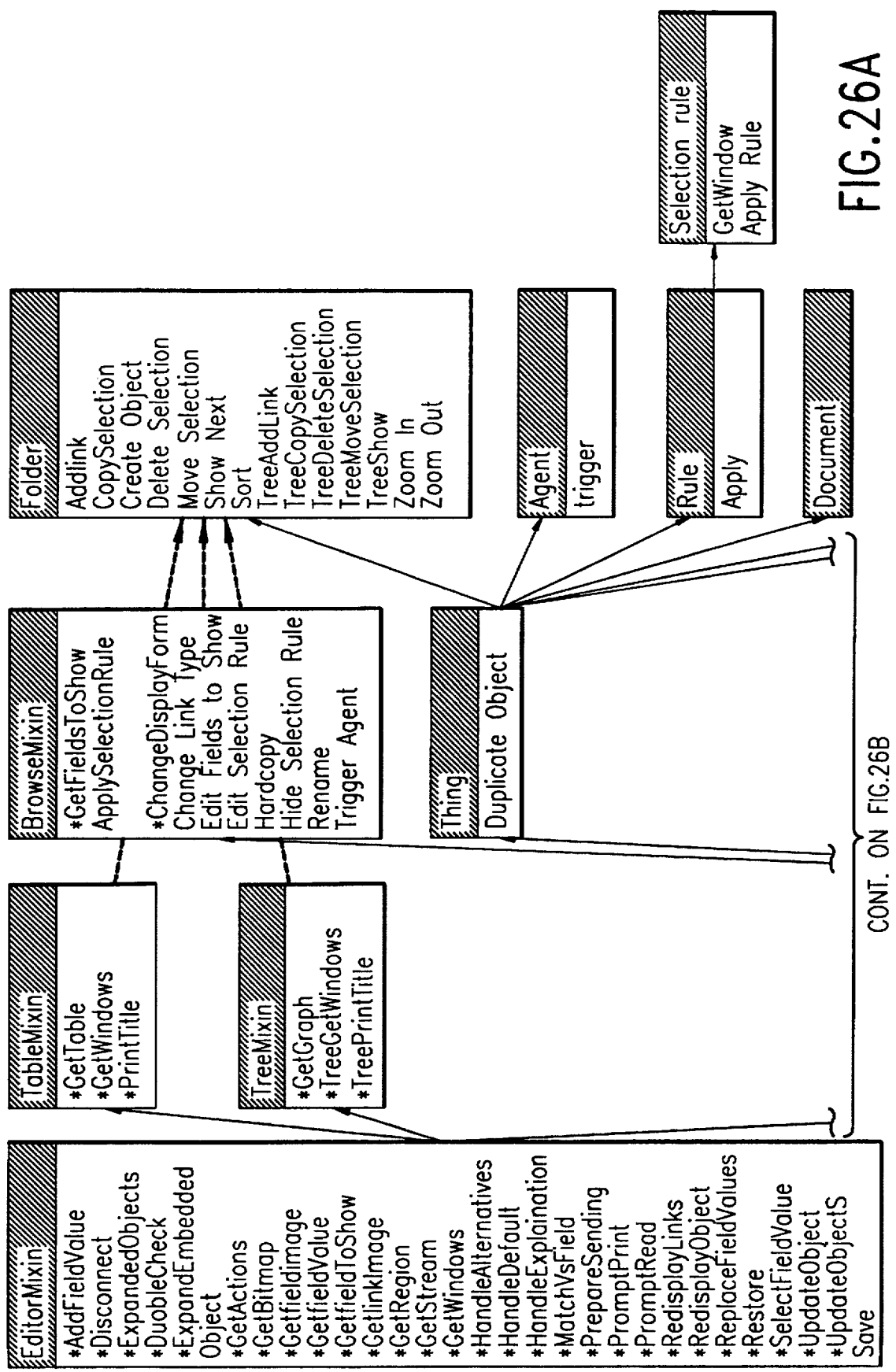
FIG. 26 shows the object class and methods structure, at the program level, of the object lens system, in accordance with a preferred embodiment of the invention.
Figure 26B:
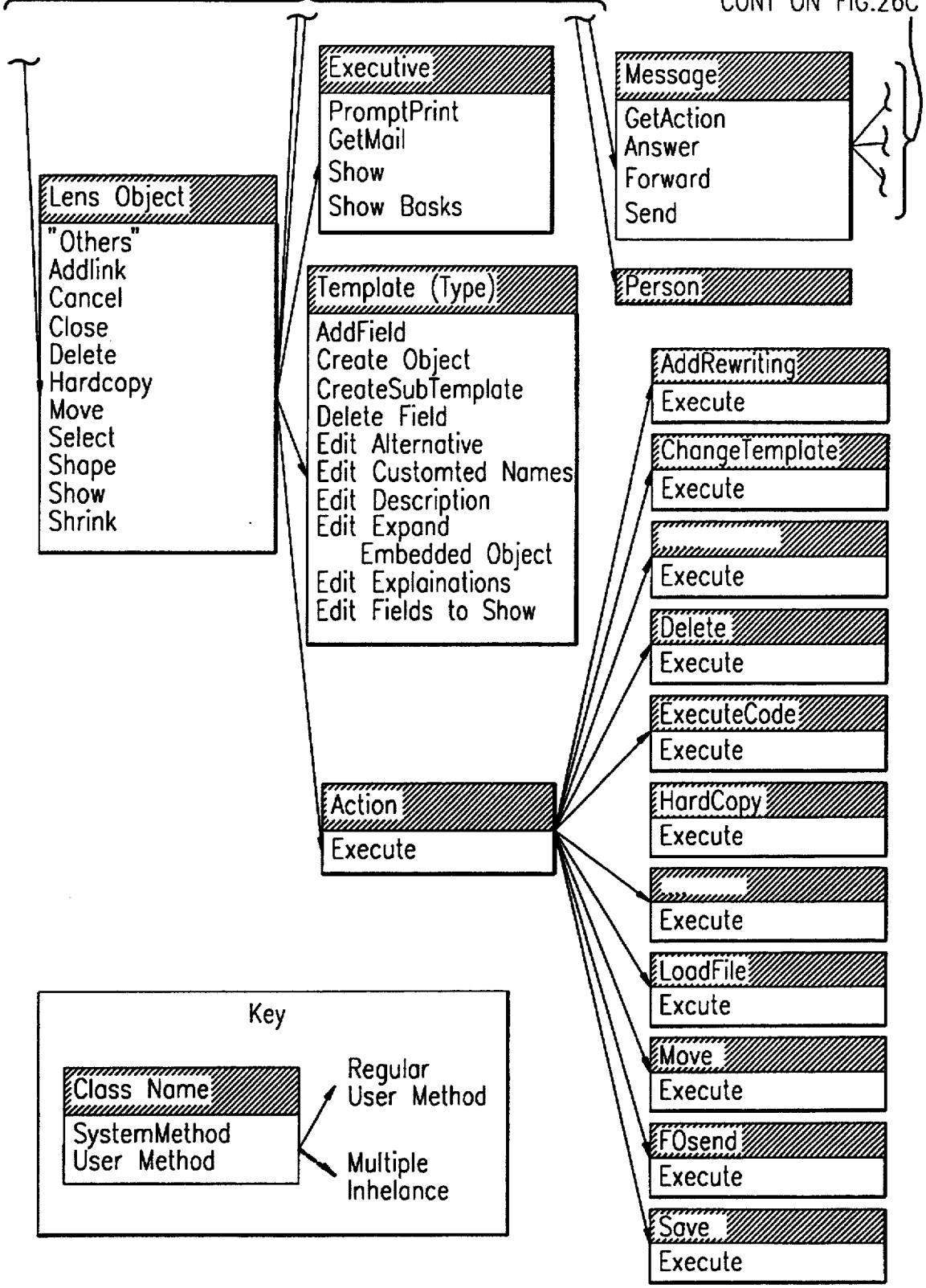
Figure 26C:
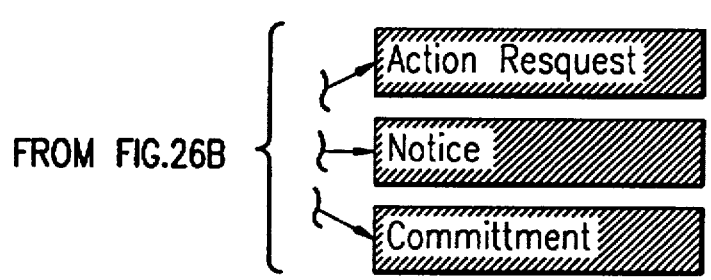

The structure of the Object Lens program in accordance with a preferred embodiment of the invention is shown in FIG. 26. The top level, non-mixin class is Lens Object. It contains the most general information about all Lens Objects. The classes known to the non-programmer ["user classes"] start from Thing. All user classes have Type (Template) as their meta-class. A user class contains a description of each of the fields to be used by an instance of that class. The attributes of a field include its name, its customized name, its default value, the alternatives to be shown in its alternatives menu, and the descriptions which may be inserted into it. Fields are inherited from parent user-classes but may be modified locally.

A class also contains three kinds of methods: User-Action Methods (e.g. Show, Close) are accessible to the user through button-bar or pop-up menu items and are typically attached to the class. Presentation methods (e.g. show an object through a template-form) are typically attached to one of the mixins. Other System Methods, such as Prepare Sending, perform system utility functions and are also typically attached to a mixin.

Methods by Class

The methods listed below are either system or presentation methods (which start with a '*') or user methods which, with the exception of '*Other*', do not start with a '*'.

Editor Mixin

This mixin contains many presentation methods used by all classes in object lens when an object is presented through a Template-Form. The mixin also contains some methods which are useful for all objects in Object Lens which have nothing to do with presentation.

Methods for Presenting a Template-Form

| Methods for Presenting a Template-Form | |
| --- | --- |
| Expand Embedded Objects | Show an object embedded in another. |
| Get Actions | Returns the list of actions which is stored in the class. This is used to determine what is shown on the button-bar. |
| Get Bitmap | Returns an object's bitmap, which is used as part of it's icon image. This is called by Get Link Icon |
| Get FieldImage | Returns a field's field-name image. This image is used as the buttonable field label when an object is presented as a "template form" through the TEdit editor. |
| Get Fields To Show | Returns the list of fields which objects of that class should show. |
| Get Link Image | Return an object's "icon image," which is used both to show links within field and when an object is "shrink"ed. |
| Get Region | Returns the window region within which an object is to be shown. |
| Get Stream | Returns a stream of characters and images which TEdit can present as a "template-form" for the object. Called by Get Window. |
| Get Window | Create a TEdit window with button bar and other attributes and put an object's stream into it. |
| Select Field Value | Does the equivalent of clicking the mouse in a field: positions the cursor in a field for editing. Called, for example, when an object is first displayed through a template-form. |

Methods for Manipulating the Contents of a Template-Form

| | |
| --- | --- |
| Add Field Value | Adds an item to a field which contains a list of items (e.g. when an alternative is added by middle-buttoning on the alternatives list. Handles TEdit routines. |
| Disconnect Expanded Objects | When a field with an expanded embedded object has its contents replaced with something else (e.g. by the default value for that item), this method disengages the old embedded object from the embedding one. This is needed to adjust for complications arising because the current implementation is built on top of TEdit. |
| Double Check | Prompts the user to confirm an action which may not be reversible. |
| Handle Alternatives | Pops-up a list of alternative values for a field. Sent either when a user left-buttons the field-image for a field or when he selects the "alternatives" item from the pop-up menu generated by middle-buttoning the field image for a field. |
| Handle Default | Puts the default value for a class's field into the TEdit area for that field in the object. |
| Handle Explanation | Shows the explanation for a field. |
| Prompt Print | Places a string in the prompt area at the top of the window in which the object is being presented |
| Prompt Read | Prompts the user to type input into the prompt area at the top of the window in which the object is being presented |
| Redisplay Links | Update the icon images of objects contained within the object receiving the message. |
| Redisplay Object | Redisplay the object. |
| Replace Field Value | Replace the contents of a field being shown in the template-form by TEdit. |

Methods for Updating an Object from the Contents of a Template-Form

| | |
| --- | --- |
| Update Object | Takes the edit stream from TEdit and updates an object in memory. |
| Update Object | Handles the TEdit routines for the previous method. |

Methods which Only Affect the Saved Object

| | |
| --- | --- |
| Get Field Value | Return a readable string of an object's field's content for displaying or comparison. If a field contains an object link, this method looks in the contained object and returns the contents of the first non-empty field. This method is called, among other places, by Get Table. |
| Prepare Sending | Prepares an object for sending over an E-Mail system by converting it to a string. |
| MatchVsField | Checks to see whether a field's value matches a given pattern. If the pattern is a simple string, the field matches it if the field contains the string. If the pattern is an object description, the match is checked by *Resolve-ing the description with the contents of the field. If the pattern is a list, then the CAR of the list is applied as a function to the results of matching each element of the CDR of the list as a pattern. For example, the pattern (or "foo" "bar") would match if the field contained either "foo" or "bar". This list matching is recursive, but reveals LISP-like code to the user. |
| Resolve | Determine whether an object matches a pattern. Calls MatchVsField. |
| Save | Saves the contents of an object to a user-specified file in the Xerox Interlisp file system. Any objects which are linked to the object being |

TableMixin

TableMixin contains methods which are only used by the Folder object. The methods are stored in TableMixin for code management reasons only. TableMixin was not made a sub-class of LensObject because its methods are, in some sense, applicable to systems other than Object Lens.

| | |
|---|---|
| GetTable | Creates the data-structure which is used by the Xerox Table-browser when an object is presented through a table-form. Called by the next method. |
| GetWindow | Presents an object through a table-form. |
| PrintTitle | Displays the headings for a table-form. |

TreeMixin

TreeMixin contains methods which are only used by the Folder object. The methods are stored in TreeMixin for code management reasons only. TreeMixin was not made a sub-class of LensObject because its methods are, in some sense, applicable to systems other than Object Lens.

| | |
|---|---|
| GetGraph | Creates the data-structure which is used by the Xerox Grapher when an object is presented through a graph-form. Called by the next method. |
| TreeGetwindow | Presents an object through a graph form. |
| TreePrintTitle | Displays the headings for a graph-form. |

Lens Object

| | |
|---|---|
| Others | Brings-up a pop-up menu showing all the actions available for an object which did not fit on the menu-bar |
| Add Link | Causes a mode-change which changes the cursor and waits for a mouse-down event. A link to the object selected by the mouse-down is then inserted at the cursor location. |
| Cancel | Closes the window without saving any of the changes which may have been made. |
| Close | Saves any changes which may have been made (using *UpdateObject) and then closes the window. |
| Delete | Removes from the linking object the link to the selected object. This might be better called "Remove Link." |
| Hardcopy | Create a hardcopy of the current object. |
| Move | Causes a mode-change which allows the user to reposition the object's window. |
| Select | Selects a linked object within another object. |
| Shape | Causes a mode-change which allows the user to reshape the object's Window. |
| Show | Causes the object to be presented using its current presentation form. |
| Shrink | Saves any changes which may have been made and then turns the object into an icon which may be placed on the desktop. |

BrowserMixin

BrowserMixin contains methods which are only used by the Folder object. The methods are stored in BrowserMixin for code management reasons only. BrowserMixin was made a sub-class of LensObject only because its methods are specific to Object Lens.

| | |
|---|---|
| GetFieldsToShow | Returns the list of fields which are to be shown when that object is presented through a table-form or graph-form (whichever is currently being used) |
| Apply Selection Rule | Causes the system to remove all links from the folder and to apply the folder's selection rule to each object in the system. Sends the selection rule's "Apply Rule" message. |
| Change Display Format | Causes the folder to toggle between being displayed as a table-form and being displayed as a graph-form. |
| Change Link Type | Brings up a menu from which the user can select the type of thing the folder likes to contain. |
| Edit Fields to Show | Allows the user to change which fields are to be shown in either a table-form or a graph-form. |
| Edit Selection Rule | Opens a secondary window below the folder to display the selection rule for the folder. |
| Hardcopy | Causes the folder's contents to be hardcopied. |
| Hide Selection Rule | Closes the secondary window which contains the selection rule. |
| Rename | Prompts the user to type-in the new name for the folder. |
| Trigger Agent | Triggers all agents which apply to this folder |

Executive

This is the "control panel" which says "Object Lens" on it.

| | |
|---|---|
| Promptprint | Displays something in the prompt area of the executive's form using an attractive font. |
| Get Mail | Causes any new mail available on the system to be put into the user's *New Mail folder. |
| Show | Brings up the Executive's form in a window |
| Show Basics | Brings up a menu which allows the user access to the *All Types, *All Agents, and *New Mail folders and to the folders which contain the instances of any type. When any of these folders (except *New Mail) are brought up, their contents are refreshed to contain all instances of their appropriate type. |

Action

| | |
|---|---|
| Execute | Passes-on action requests found on the right hand side of rules to its sub-classes. |

Action's Progeny

| | |
|---|---|
| Execute | Executes the action when requested by the right hand side of rules. |

Template (Type)

| | |
|---|---|
| Add Field | Prompts the user for name of the new field to be added to the type |
| Create Object | Creates an instance of the type |
| Create SubTemplate | Creates a sub-class of the type, after prompting the user for the sub-class's name and calling Add Field to identify any additional fields the sub-class should contain. |
| Delete Field | Displays a list of fields in the type and lets the user select which ones are to be deleted. |
| Edit Alternatives | Displays the list of alternatives for each field through a template form for the type and allows the user to edit them. |
| Edit Customized Names | Displays the customized name for each field through a template form for the type and allows the user to edit them. |
| Edit Descriptions | Pops-up a menu of types for a selected field and allows the user to limit the types of descriptions which may be inserted into that field. |
| Edit Expand Embedded Object | Pops up a list of fields and allows the user to select in which fields links are to be shown as embedded template-forms as opposed to as link-icons. |
| Edit Explanations | Displays the explanation for each field through a template form for the type and allows the user to edit them. |
| Edit Fields to Show | Pops up a list of fields and allows the user to select which fields are to be shown to the user (as opposed to hidden) when instances of the type are presented to the user through the type's template-form. |

Thing

| | |
|---|---|
| Duplicate Object | Creates a duplicate of the object which the user is allowed to modify. The object has all the same slot values but a different object ID. |

Message

| | |
|---|---|
| GetActions | Looks at the value of the "Creator" field to determine which of three lists of actions (one containing "Send," (one containing "Answer" and "Forward," and one containing "Resend") should be displayed through the button-bar. |
| Answer | Creates a new message (of an appropriate type to be selected by the user from a limited menu of appropriate types) which refers to the message being answered. |
| Forward | Creates a new message which contains the old one and which can be forwarded to a new person. |
| Send | Calls *PrepareSending and arranges to have the message shipped off to the addressees. |

Folder

Certain functionality, like "Add Link," requires a different method depending on whether the folder is being displayed through a table or a graph. This is due to a limitation in LOOPS which prevents the inheritance path from being modified.

| | |
|---|---|
| Add Link | Supports the special behavior required when adding a link to a folder. |
| Copy Selection | Causes a mode change - the cursor changes until the next mouse-down event. When the user selects another folder, the items in the original folder which were selected are linked into the new folder. |
| Create Object | Creates an instance of the same type as the folder likes to contain and inserts it into the folder. |
| Delete Selection | Removes the links from the folder to the selected items. |
| Move Selection | Removes the links from the folder to the selected items. Causes a mode change - the cursor changes until the next mouse-down event. When the user selects another folder, the items in the original folder which were selected are linked into the new folder. |
| Show Next | Displays through its default form the object in the folder after the one which is currently selected. |
| Sort | Sorts the contents of the folder using a user-selected field of the objects in the folder. |
| TreeAdd Link | Same as Add Link, only this works for graph-forms. |
| Treecopy Selection | Same as Copy Selection, only this works for graph-forms. |
| TreeDelete Selection | Same as Delete Selection, only this works for graph-forms. |
| TreeMove Selection | Same as Move Selection, only this works for graph-forms. |
| TreeShow | Same as Show, only this works for graph-forms. Show is inherited from Lens Object and causes the object to be displayed through the default form, which, in the case of a folder, is a table. |
| Zoom In | Causes the nodes in a graph to become less closely spaced. |

| | |
|---|---|
| Zoom Out | Causes the nodes in a graph to become more closely spaced. |

Agent

| | |
|---|---|
| Trigger | Applies all of an agent's rules to all the items in the agent's folder. |

Rule

| | |
|---|---|
| Apply | Calls Resolve to see if an object matches the rule's description. If it does, it calls Execute for the rule's action. |
| GetWindow | This is what puts-up the secondary window to display a folder's selection rule. |
| Apply Rule | Calls Resolve to see if an object matches the rule's description. If the object does, the object is linked into the folder. |

Single Instance Classes

There are two classes which have a single, pre-defined instance ("system instances"): *Executive and *New Mail. In addition, there are so called "virtual folders" which do not exist at load-time but which are created by the system and filled with all instances of a particular type upon the user's request. Virtual folders include: *All Types, *All Agents, *All Folders, and *All XXXXXs where XXXXX is any user-class of thing.

The Organization of the Files

Each file in the system is listed, followed by a brief summary of its contents.

| | |
|---|---|
| SystemInstances | Definitions of the system instances described above. This folder also contains description objects, such as the THING description which appears as a default in a newly instantiated rule, which must exist before the system can be used. |
| Mixins | Class Definitions for EditorMixin, TableMixin and TreeMixin. |
| MixinMethods | Methods for the above classes. |
| LensObjects | Class Definitions for LensObject, BrowserMixin, and Executive. |
| LensObjectMethods | Methods for the above classes. |
| Actions | Class Definitions for Action and all its sub-classes. |
| ActionsMethods | Methods for the above classes. Things Class Definitions for Thing, Folder, Agent, and Rule and all their sub-classes except for Message. |
| ThingsMethods | Methods for the above classes. |
| Messages | Class Definitions for Message and all its sub-classes. |
| MessagesMethods | Methods for the above classes. |
| LensUtilities | Supporting functions called by the first eleven files. |
| NewFns | More supporting functions. |
| NewFns2 | More supporting functions. |
| NewExpr | These are expressions which must be loaded and evaluated at system startup time after all other files have been loaded. This file is not pre-compiled (i.e. not pre-evaluated) and does things like initialize variables and start processes). |
| GeneralUtilities | General support functions for the above which could be used by any system and are therefore not specific to Object lens. |
| Things | Definitions of Thing and many of its subclasses. |

Additional Requirements

The Object Lens code attached to this application assumes that the following changes have been made to the standard Xerox Lisp environment, containing TEdit and Loops:

(1) The following three file package functions are modified to allow spaces in class names:
  (a) MethodFileOut
  (b) ObjectFileOut
  (c) ClassFileOut (2) The following interfaces with a mail transfer mechanism are provided in a way that is equivalent to the Lafite mail system:
  (a) Definitions of the following:
    (i) variables
      LAFITESTAMPLENGTH24
      DELETEDFLAG(CHARCODE)
      UNDELETEDFLAG(CHARCODE)
      SEENFLAG(CHARCODE)
      UNSEENFLAG(CHARCODE)
      LAFITEDELETEPOSITIONS20
      LAFITESEENPOSITIONS21
      LAFITEMARKPOSITION22
    (ii) records
      DEFAULTHOST&DIR
      LAFITEMSG
      LAFITEOPS
      LAFITEUSERDATA
      MAILFOLDER
      MAILSERVER
      MAILSERVEROPS
      OPENEDMAILBOX
      OUTBOX
      OUTBOXITEM
      SENDINGCOMMAND
    (iii) functions (required)
      Poll.NewMail
      Get.Messages
      Send.Message
    (iv) functions(optional)
      Get.User.Data
      Check.For.Mail These functions provide the following functionality:

| | |
|---|---|
| Poll.NewMail | Takes the users name and password, and checks if any of the mailboxes have new mail. Returns one of the following: NEW.MAIL (if new mail is waiting), NO.MAIL (if no mail is waiting), SOME.UP (if no mail is waiting at the servers that are up, but some servers are down), NONE.UP (if no mail servers are up). |
| Get.Messages | Takes the users name, password and three functions. It returns a list of streams, one for each message in the user's mailbox. The first function is applied to each mail server. The second function is given the number of messages in the mailbox on each mail server, and the third function is applied to each message as it is retrieved. |
| Send.Message | Takes a message, a name and a password, where the message is already formatted, and |

| | |
|---|---|
| | posts the message to the mail server. |
| Get.User.Data | Takes the users name and password; authenticates the information in a name server, and looks up a list of mailboxes. Returns a record of type LAFITEUSERDATA containing this information. |
| Check.For.Mail | This takes the users name and password and a function and a variable. While the value of the variable is true, it continuously checks if the user has new mail, and retrieves the message and applies the message function to each message. |

What is claimed is:

1. A computer user interface, comprising:
   means for graphically representing objects that collectively are instances of a plurality of object types,
   wherein a folder is one of such object types and comprises a collection of instances of an object type;
   wherein an agent is another of such object types and wherein an instance of the agent object type comprises an indication of a collection of objects, an indication of at least one rule to be applied to the collection of objects, and an indication of an event the occurrence of which causes the rule to be applied to the collection of objects; and
   wherein the objects are semi-structured by having a collection of fields, wherein information in at least one of the fields may be of any type, so as to be interpretable by agents in a uniform way; and
      wherein the means for graphically representing and the means for structuring function so that each object is presented to, edited by, and acted upon by the user in a substantially uniform way, regardless of type.

2. A computer user interface according to claim 1, further comprising means for defining each object type, and for displaying each instance of an object type, by means of a template.

3. A computer user interface according to claim 2, wherein a data record is one of such object types.

4. A computer user interface, comprising:
   means for graphically representing objects that collectively are instances of a plurality of object types, each object type having a set of fields;
   wherein a data record is one of such object types;
   wherein an agent is another of such object types and wherein an instance of the agent object type comprises an indication of a collection of objects, an indication of at least one rule to be applied to the collection of objects, and an indication of an event the occurrence of which causes the rule to be applied to the collection of objects; and
   means for organizing the object types in a hierarchy of increasing specialization of a generic object type and for causing each specialized object type to inherit one or more properties of any parent thereof.

5. A computer user interface according to claim 4, wherein the means for organizing the object types includes means for causing each specialized object type to inherit the fields of any parent thereof.

6. A computer user interface according to claim 5, wherein each object type has a set of actions that can be performed thereon, and the means for organizing the object types includes means for causing each specialized object type to inherit the actions of any parent thereof.

7. A computer user interface according to claim 6, wherein each object type has a set of views associated with any parent thereof.

8. A computer user interface according to claim 4, further comprising:
   means for defining each type of object, and for displaying each instance of an object, by means of a template;
   wherein the means for graphically representing and the means for defining function so that each object is presented to, edited by, and acted upon by the user in a substantially uniform way, regardless of type.

9. A computer user interface according to claim 4, wherein a folder is one of such object types and comprises a collection of instances of an object type.

10. A computer user interface comprising:
    means for graphically representing objects that collectively are instances of a plurality of object types, each object type having a set of fields, and wherein an agent is one of such object types and wherein an instance of the agent object type comprises an indication of a collection of objects, an indication of at least one rule to be applied to the collection of objects, and an indication of an event the occurrence of which causes the rule to be applied to the collection of objects; and
    means for causing the objects to be semi-structured by having a collection of fields, wherein information in at least one of the fields may be of any type, so as to be interpretable by agents in a uniform way.

11. A computer user interface according to claim 10, wherein a rule constitutes another of such object types, such rule indicating an action to be taken by an agent and objects to be acted upon.

12. A computer user interface according to claim 11, wherein a rule further includes, as part of a value of one of the fields, a specification of a condition to be applied to a first object in terms of properties of a second object to which the first object is linked.

13. A computer user interface according to claim 10, wherein an agent is capable of acting upon instances of any of the plurality of object types.

14. A computer user interface according to claim 10, wherein an agent includes means for being triggered by an external event, creation of an object, or creation of a link.

15. A computer system, comprising:
    means for creating a plurality of object types using a template to create different templates for different object types;
    means for creating instances of an object type using the templates for the object type; and
    wherein at least one of the data object types is an agent which performs functions on other data object types and wherein an instance of the agent object type comprises an indication of a collection of objects of at least one of the object types, an indication of at least one rule to be applied to the collection of objects, and an indication of an event the occurrence of which causes the rule to be applied to the collection of objects.

16. A computer system comprising:
    means for easily defining new object types with different fields;
    means for creating instances of objects of the defined object types;
    means for easily defining links between instances of objects;
    means for providing traversal of links; and
    means for easily defining agents as object types and for performing functions on instances of objects and wherein an instance of the agent object type comprises an indication of a collection of objects of at least one of the defined object types, an indication of at least one rule to be applied to the collection of objects, and an indication of an event the occurrence of which causes the rule to be applied to the collection of objects.

17. The computer system of claim 16, further comprising:

means for creating user-tailorable views of an object type, wherein a view is defined by one or more selected fields of the object type.

18. The computer system of claim 17, wherein agents are defined as objects having fields including functions to be performed, and wherein the means for creating views allows a view to be created based on fields of agent objects.

19. The computer system of claim 18, wherein link may be active links in fields of objects; and wherein the means for creating views may create a view of objects generated by following active links in the field defined for the view.

20. The computer system of claim 17, wherein links may be active links in fields of objects; and wherein the means for creating views may create a view of objects generated by following active links in the field defined for the view.

21. The computer system of claim 20, wherein a field may contain both text and an active link.

22. An object-oriented computer user interface system, comprising:

a semi-structured generic object type defining a collection of fields, wherein information in at least one of the fields may be of any type;

an agent object type derived from the generic object type, wherein an agent, an instance of the agent object type, comprises:

an indication of a collection of instances of an object type derived from the generic object type, a collection of rules to be applied to the collection of instances of an object type, an indication of a trigger condition indicating when the collection of rules is to be applied, and a trigger method for evaluating occurrence of the trigger condition; and a data record object type derived from the generic object type, wherein a data record, an instance of the data record object type, comprises:

a collection of fields for storing data.

23. The object-oriented computer user interface of claim 22, further comprising:

a folder object type, derived from the generic object type, wherein a folder, an instance of the folder object type, comprises:

a collection of instances of an object type; and a display method for displaying of the collection of instances of the object type in a user-selected format.

24. The object-oriented computer user interface of claim 23, wherein the indication of the collection of instances of an object type in an agent is an indication of a folder.

25. The object-oriented computer user interface of claim 22, further comprising:

a rule object type, derived from the generic object type, wherein a rule, an instance of the rule object type, comprises:

a collection of descriptions corresponding to an object type describing conditions to be applied to instance of the object type; and a corresponding collection of actions to be performed on an instance of the object type if the condition is met.

26. The object-oriented computer user interface of claim 22, further comprising:

a description object type, derived from the generic object type, wherein a description, an instance of the description object type, comprises:

a collection of fields corresponding to fields of a first object type for storing values indicative of conditions to be met by an instance of the first object type, wherein an instance of the first object type may include a link to an instance of a second object type and wherein a value stored in one of the fields of the description is another description of the second object type; and wherein the collection of descriptions in a rule is a collection of instances of the description object type.

27. The object-oriented computer user interface of claim 22, wherein a first instance of an object type derived from the generic object type may include a link to a second instance of an object type derived from the generic object type.

28. The object-oriented computer user interface of claim 27, wherein the link is an active link that is displayed to the user and is selectable by the user to cause display of the second instance.

29. The object-oriented computer user interface of claim 22, further comprising:

means for permitting a user to select fields of object for displaying the object, thereby providing for user-tailorable views.

* * * * *